US011637280B2

(12) United States Patent
Newbound et al.

(10) Patent No.: US 11,637,280 B2
(45) Date of Patent: Apr. 25, 2023

(54) PRECHARGED NEGATIVE ELECTRODE MATERIAL FOR SECONDARY BATTERY

(71) Applicant: KRATOS LLC, Irmo, SC (US)

(72) Inventors: Timothy D. Newbound, Chelsea, MI (US); Richard Owen Crowther, Redford, MI (US); Reza Kavian, Chelsea, MI (US); Bruce Andrew Kraay, Irmo, SC (US); Jeff A. Norris, Columbia, SC (US)

(73) Assignee: Kratos LLC, Irmo, SC (US)

( * ) Notice: Subject to any disclaimer, the term of this patent is extended or adjusted under 35 U.S.C. 154(b) by 0 days.

(21) Appl. No.: 16/497,601

(22) PCT Filed: Mar. 30, 2018

(86) PCT No.: PCT/US2018/025492
§ 371 (c)(1),
(2) Date: Sep. 25, 2019

(87) PCT Pub. No.: WO2018/183909
PCT Pub. Date: Oct. 4, 2018

(65) Prior Publication Data
US 2020/0259170 A1 Aug. 13, 2020

Related U.S. Application Data

(60) Provisional application No. 62/479,444, filed on Mar. 31, 2017.

(51) Int. Cl.
H01M 4/131 (2010.01)
H01M 4/134 (2010.01)
(Continued)

(52) U.S. Cl.
CPC .......... H01M 4/366 (2013.01); H01M 4/133 (2013.01); H01M 4/134 (2013.01);
(Continued)

(58) Field of Classification Search
None
See application file for complete search history.

(56) References Cited

U.S. PATENT DOCUMENTS 4,626,335 A 12/1986 Cupp et al.
5,518,187 A 5/1996 Bruno et al.
(Continued)

FOREIGN PATENT DOCUMENTS

CN 1891668 A 1/2007
CN 102208617 A 10/2011
(Continued)

OTHER PUBLICATIONS

Appetecchi et al., "Synthesis of Hydrophobic Ionic Liquids for Electrochemical Applications," Journal of The Elecrochemical Society, 2006, 153(9) A1685-A1691.
(Continued)

Primary Examiner — Yoshitoshi Takeuchi
(74) Attorney, Agent, or Firm — Michael Best & Friedrich LLP

(57) ABSTRACT

Provided are methods of producing a negative electrode including comminuting Li-Group IVA alloy particles in a solvent to a desired particle size distribution range, exposing surfaces of the Li-Group IVA alloy particles to a monomer or polymer surface modifier present during the comminution process, the surface modifier forming a continuous coating on an exposed surface of the Li-Group IVA alloy particles,
(Continued)

removing the solvent, and adding the surface-modified Li-Group IVA alloy particles to a negative electrode material by a coating process.

17 Claims, 14 Drawing Sheets

(51) Int. Cl.
| | |
|---|---|
| H01M 4/136 | (2010.01) |
| H01M 4/1395 | (2010.01) |
| H01M 4/36 | (2006.01) |
| H01M 4/133 | (2010.01) |
| H01M 4/1393 | (2010.01) |
| H01M 4/38 | (2006.01) |
| H01M 4/587 | (2010.01) |
| H01M 4/62 | (2006.01) |
| H01M 4/66 | (2006.01) |
| H01M 10/0525 | (2010.01) |
| H01M 4/02 | (2006.01) |

(52) U.S. Cl.
CPC ....... *H01M 4/1393* (2013.01); *H01M 4/1395* (2013.01); *H01M 4/364* (2013.01); *H01M 4/386* (2013.01); *H01M 4/387* (2013.01); *H01M 4/587* (2013.01); *H01M 4/622* (2013.01); *H01M 4/661* (2013.01); *H01M 10/0525* (2013.01); *H01M 2004/027* (2013.01)

(56) References Cited

U.S. PATENT DOCUMENTS

| | | |
|---|---|---|
| 5,541,022 A | 7/1996 | Mizumoto et al. |
| 6,132,801 A | 10/2000 | Linford |
| 6,221,941 B1 | 4/2001 | Strauss et al. |
| 6,268,041 B1 | 7/2001 | Goldstein |
| 6,841,079 B2 | 1/2005 | Dunbar et al. |
| 6,855,204 B2 | 2/2005 | Kauzlarich |
| 7,008,722 B2 | 3/2006 | Huang |
| 7,507,502 B2 | 3/2009 | Kojima et al. |
| 7,531,155 B2 | 5/2009 | Li |
| 7,588,623 B2 | 9/2009 | Dover et al. |
| 7,588,862 B2 | 9/2009 | Dasgupta et al. |
| 7,838,147 B2 | 11/2010 | Kawase et al. |
| 7,883,995 B2 | 2/2011 | Mitchell et al. |
| 8,071,238 B2 | 12/2011 | Le |
| 8,119,288 B2 | 2/2012 | Zhamu et al. |
| 8,216,719 B2 | 7/2012 | Yamada et al. |
| 8,658,062 B2 | 2/2014 | Kumta et al. |
| 8,673,490 B2 | 3/2014 | Kumar et al. |
| 8,834,746 B1 | 9/2014 | Stachwiak et al. |
| 9,231,243 B2 | 1/2016 | Cui et al. |
| 9,461,304 B2 | 10/2016 | Newbound et al. |
| 9,461,309 B2 | 10/2016 | Newbound et al. |
| 10,211,454 B2 | 2/2019 | Newbound et al. |
| 11,005,097 B2 | 5/2021 | Newbound et al. |
| 2003/0036000 A1 | 2/2003 | Mori et al. |
| 2004/0137327 A1 | 7/2004 | Gross et al. |
| 2005/0136330 A1 | 6/2005 | Mao et al. |
| 2006/0083986 A1 | 4/2006 | Li et al. |
| 2006/0133980 A1 | 6/2006 | Nanba et al. |
| 2006/0147369 A1 | 6/2006 | Bi et al. |
| 2006/0147797 A1 | 7/2006 | Wu et al. |
| 2007/0077490 A1 | 4/2007 | Kim et al. |
| 2007/0224508 A1 | 9/2007 | Aramata et al. |
| 2008/0026297 A1 | 1/2008 | Chen et al. |
| 2008/0248307 A1 | 10/2008 | Jurbergs et al. |
| 2009/0042102 A1 | 2/2009 | Cui et al. |
| 2009/0042136 A1 | 2/2009 | Tour et al. |
| 2009/0047773 A1 | 2/2009 | Mitchell et al. |
| 2009/0269669 A1 | 10/2009 | Kim et al. |
| 2009/0305131 A1 | 12/2009 | Kumar et al. |
| 2010/0062338 A1 | 3/2010 | Golightly et al. |
| 2010/0092868 A1 | 4/2010 | Kim et al. |
| 2010/0119942 A1 | 5/2010 | Kumar et al. |
| 2010/0120179 A1 | 5/2010 | Zhamu et al. |
| 2010/0139744 A1 | 6/2010 | Rogojina et al. |
| 2010/0148144 A1 | 6/2010 | Britton |
| 2010/0261050 A1 | 10/2010 | Kang et al. |
| 2011/0111303 A1 | 5/2011 | Kung et al. |
| 2011/0215280 A1 | 9/2011 | Obrovac et al. |
| 2011/0236753 A1 | 9/2011 | Kuriki et al. |
| 2011/0236754 A1 | 9/2011 | Kuriki et al. |
| 2011/0250348 A1 | 10/2011 | Mao et al. |
| 2011/0281180 A1 | 11/2011 | Kim et al. |
| 2011/0291240 A1 | 12/2011 | Yamazaki |
| 2012/0070736 A1 | 3/2012 | Ohara et al. |
| 2012/0121977 A1 | 5/2012 | Xu et al. |
| 2012/0205624 A1 | 8/2012 | Sargent et al. |
| 2012/0244391 A1 | 9/2012 | Yushin et al. |
| 2012/0275981 A1 | 11/2012 | Foord et al. |
| 2013/0004846 A1 | 1/2013 | Kim et al. |
| 2013/0039952 A1 | 2/2013 | Petersson |
| 2013/0045420 A1 | 2/2013 | Biswal et al. |
| 2013/0065116 A1 | 3/2013 | Ogihara et al. |
| 2013/0069601 A1 | 3/2013 | Coowar et al. |
| 2013/0089790 A1 | 4/2013 | Byon et al. |
| 2013/0136986 A1 | 5/2013 | Scoyer |
| 2013/0164612 A1 | 6/2013 | Tanemura et al. |
| 2013/0177820 A1 | 7/2013 | Kumta et al. |
| 2013/0184385 A1 | 7/2013 | Ogihara |
| 2013/0216907 A1 | 8/2013 | Rayner et al. |
| 2013/0221489 A1 | 8/2013 | Cao et al. |
| 2013/0260020 A1 | 10/2013 | Tomikawa et al. |
| 2013/0266865 A1 | 10/2013 | Kwon et al. |
| 2013/0288126 A1 | 10/2013 | Liu et al. |
| 2013/0295454 A1 | 11/2013 | Huang et al. |
| 2013/0302675 A1 | 11/2013 | Kouzu et al. |
| 2013/0323595 A1 | 12/2013 | Sohn et al. |
| 2014/0042390 A1 | 2/2014 | Gruner et al. |
| 2014/0050983 A1 | 2/2014 | Kim et al. |
| 2014/0057168 A1 | 2/2014 | Newbound et al. |
| 2014/0057179 A1 | 2/2014 | Yushin et al. |
| 2014/0106220 A1 | 4/2014 | Xiao et al. |
| 2014/0127573 A1 | 5/2014 | Xiao |
| 2014/0134499 A1 | 5/2014 | Newbound et al. |
| 2014/0205905 A1 | 7/2014 | Xiao et al. |
| 2014/0246398 A1 | 9/2014 | Zaghib et al. |
| 2014/0310951 A1 | 10/2014 | Grant et al. |
| 2014/0332717 A1 | 11/2014 | Paireau et al. |
| 2015/0115206 A1 | 4/2015 | Fujii et al. |
| 2015/0140423 A1 | 5/2015 | Brown et al. |
| 2015/0243973 A1 | 8/2015 | Newbound et al. |
| 2015/0263342 A1* | 9/2015 | Newbound ............. H01M 4/42 427/122 |
| 2016/0093879 A1 | 3/2016 | Song et al. |
| 2016/0164081 A1 | 6/2016 | Cui et al. |
| 2017/0149056 A1 | 5/2017 | Newbound et al. |
| 2017/0149066 A1 | 5/2017 | Newbound et al. |
| 2017/0170477 A1 | 6/2017 | Sakshaug et al. |
| 2017/0338476 A1 | 11/2017 | Newbound et al. |
| 2018/0342732 A1 | 11/2018 | Troegel et al. |
| 2019/0214642 A1 | 7/2019 | Newbound et al. |
| 2019/0363349 A1 | 11/2019 | Newbound et al. |
| 2020/0044240 A1 | 2/2020 | Newbound et al. |
| 2021/0013491 A1 | 1/2021 | Newbound et al. |

FOREIGN PATENT DOCUMENTS

| | | |
|---|---|---|
| CN | 102208632 A | 10/2011 |
| CN | 102544461 A | 7/2012 |
| CN | 102699334 A | 10/2012 |
| CN | 103474666 A | 12/2013 |
| DE | 4320140 A1 | 2/1994 |
| DE | 102009029054 A1 | 3/2011 |
| JP | 2005149946 A | 6/2005 |
| JP | 2007188868 A | 7/2007 |
| JP | 2008112710 A | 5/2008 |
| JP | 2010205686 A | 9/2010 |
| JP | 2010269972 A | 12/2010 |
| JP | 2011011928 A | 1/2011 |
| KR | 1020100038082 A | 4/2010 |

(56) References Cited

FOREIGN PATENT DOCUMENTS

| KR | 1020100112442 A | 10/2010 |
|---|---|---|
| KR | 1020160047301 A | 5/2016 |
| WO | WO2011060433 A1 | 5/2011 |
| WO | WO2014031780 A1 | 2/2014 |
| WO | WO2015127290 A1 | 8/2015 |

OTHER PUBLICATIONS

Baranchugov et al., "Amorphous silicon thin films as a high capacity anodes for Li-ion batteries in ionic liquid electrolytes," Electrochemistry Communications 9, 2007, 796-800.

Bates, J., et al., "Thin-film lithium and lithium-ion batteries," Solid State Ionics 2000, 135, pp. 33-45.

Biliae, A., et al., "Functionalization of semiconductor surfaces by organic layers: Concerted cycloaddition versus stepwise free radical reaction mechanisms," School of Chemistry The University of Sydney, 2006 (34 pages).

Bilic et al., "Functionalization of semiconductor surfaces by organic layers: Concerted cycloaddition versus stepwise free-radical reaction mechanism," Gruetter, Peter and Rosei, Federico and Hofer, W. (ed), Properties of single molecules on crystal surfaces, London: Imperial College Press (2006) downloaded from http://espace.library.curtin.edu.au/cgi-bin/espace.pdf?file=/2008/11/13/file_13/20114.

Buriak, "Organometallic Chemistry on Silicon and Germanium Surfaces," Chemical Reviews, 2002, vol. 102, Issue 5, pp. 1271-1308.

Chou et al., "Enhanced reversible lithium storage in nanosize silicon/graphene composite," Electrochemistry Communications 12, 2010, 303-306.

Cui, L., et al., "Carbon-silicon core-shell nanowires as high capacity electrode for lithium ion batteries," Nono Letters 2009, 9, pp. 3370-3374.

Cui, L., et al., "Crystalline-amorphous core-shell silicon nanowires for high capacity and high current battery electrodes," Nano Letters 2008, 9, pp. 491-495.

Cui, L., et al., "Light-weight free-standing carbon nanotube-silicon films for anodes of lithium ion batteries," Acs Nano 2010, 4, pp. 3671-3678.

Datta et al., "Amorphous silicon-carbon based nano-scale thin film anode materials for lithium ion batteries," Electrochimica Acta 2011, 56, 4717-4723.

Dudney et al., "Thin-film lithium and lithium-ion batteries," Solid State Ionics 135, 2000, 33-45.

Eom et al., "The design of a Li-ion full cell battery using a nano silicon and nano multilayer graphene composite anode," Journal of Power Sources, 2013, pp. 119-124.

Gauthier et al. "A Low-cost and High Performance Ball-milled Si-based Negative Electrode for high-energy Li-ion batteries," Energy and Environmental Science, 2013, vol. 6, Issue 7, pp. 2145-2155.

Ge et al., "Review of porous silicon preparation and its application for lithium-ion battery anodes," Nanotechnology 24, 2013, 422001, pp. 1-10.

Ge et al., "Scalable preparation of porous silicon nanoparticles and their application for lithium-ion battery anodes," Nano Research, 2013, 6(3):174-181.

Hallmann et al., "Wetting properties of silicon films from alkyl-passivated particles produced by mechanochemical synthesis," Journal of Colloid and Interface Science 2010, 348, 634-641.

He et al., "A novel bath lily-like graphene sheet-wrapped nano-Si composite as high performance anode material for Li-ion batteries," RSC Advances, 2011, 1, 958-960.

Heintz et al., "Mechanochemical Synthesis of Blue Luminescent Alkyl/Alkenyl-Passivated Silicon Nanoparticles," Advanced Materials, 2007, 19, 3984-3988.

Hush et al., "Functionalization of semiconductor surfaces by organic layers: Concerted cycloaddition versus stepwise free-radical reaction" Gruetter, Peter and Rosei, Federico and Hofer, W. (ed), Properties of single molecules on crystal surfaces. 2006, London: Imperial College Press.

Ji et al., "Graphene/Si multilayer structure anodes for advanced half and full lithium-ion cells," Nano Energy, 2012, 1, 164-171.

Kasavajjula, U., et al., "Nano-and bulk-silicon-based insertion anodes for lithium-ion secondary cells," Journal of Power Sources 2007, 163, pp. 1003-1039.

Koo et al., "A Highly Cross-Linked Polymeric Binder for High-Performance Silicon Negative Electrodes in Lithium Ion Batteries," Angew. Chem. Int. Ed., 2012, 51, 8762-8767.

Kushima et al., "Quantitative Fracture Strength and Plasticity Measurements of Lithiated Silicon Nanowires by In Situ TEM Tensile Experiments," ACS Nano, 2012, vol. 6, No. 11, pp. 9425-9432.

Lee et al., "Effect of Randomly Networked Carbon Nanotubes in Silicon-Based Anodes for Lithium-Ion Batteries," Journal of the Electrochemical Society 2009, 156, A905-A910.

Lu et al., "Imparting functionality to a metal-organic framework material by controlled nanoparticle encapsulation", NatureChemistry, vol. 4, Apr. 2012, pp. 310-316.

Magasinski et al., "High-performance lithium-ion anodes using a hierarchial bottom-up approach," Nature Materials, 2010, vol. 9, pp. 353-358.

Maranchi, J., et al., "High capacity, reversible silicon thin-film anodes for lithium-ion batteries," Electrochemical and Solid-State Letters 2003, 6, pp. A198-A201.

McDowell et al., "25th Anniversary Article: Understanding the Lithiation of Silicon and Other Alloying Anodes for Lithium-Ion Batteries," Advanced Materials, 2013, 25, 4966-4985.

Park, M., et al., "Silicon nanotube battery anodes," Nano Letters 2009, 9, pp. 3844-3847.

Pharr et al., "Measurements of the Fracture Energy of Lithiated Silicon Electrodes of Li-Ion Batteries," Nano Letters, 2013, 13(11):5570-7.

Pinson et al., "Theory of SEI Formation in Rechargable Batteries: Capacity Fade, Accelerated Aging and Lifetime Prediction," Journal of The Electromechanical Society, 2013, 160(2):A243-A250.

Regents of the University of Minnesota, Dept. of Physics & Astronomy, "A Metastable Initial State in Benzene Adsorption," 1998.

Regents of the University of Minnesota, Dept. of Physics & Astronomy, "An STM study of the adsorption of toluene on Si(001)," 1998.

Reindl et al., "Dispersing and stabilizing silicon nanoparticles in a low-epsilon medium," Colloids and Surfaces a—Physicochemical and Engineering Aspects 2008, 320, 183-188.

Reindl et al., "Dispersing silicon nanoparticles with a stirred media mill and subsequent functionalization with phenyl acetylene," Colloids and Surfaces A: Physicochemical and Engineering Aspects 2007, 301, 382-387.

Ren et al., "Silicon-Graphene Composite Anodes for High-Energy Lithium Batteries," Energy Technol., 2013, 1 pp. 77-84.

Rock et al., "Synthesis and characterization of electrochemically active graphite-silicon-tin composite anodes for Li-ion applications," Journal of Power Sources 2007, 164, 829-838.

Rosso-Vasic et al., "Alkyl-Functionalized Oxide-Free Silicon Nanoparticles: Synthesis and Optical Properties," Small-Wiley Journal, 2008, vol. 4, Issue 10, pp. 1835-1841.

Ruffo, R., et al., Impedance analysis of silicon nanowire lithium ion battery anodes, The Journal of Physical Chemistry 20909, 113, pp. 11390-11398.

Shuba et al., "The Effect of Powder Mixing Procedures on a-SiAlON," Journal of the American Ceramic Society, 2006, 89(3):1110-1113.

Song, T., et al., "Arrays of sealed silicon nanotubes as anodes for lithium ion batteries," Nano Letters 2010, 10, pp. 1710-1716.

Tao et al., "Self-supporting Si/Reduced Graphene Oxide nanocomposite films as anode for lithium ion batteries," Electrochemistry Communications 13, 2011, 1332-1335.

Thakur et al., "Inexpensive method for producing macroporous silicon particles (MPSPs) with pyrolyzed polyacrylonitrile for lithium ion batteries," Scientific Reports, 2012, 2:795, pp. 1-7.

(56) References Cited

OTHER PUBLICATIONS

Verdoni et al., "A fractionation process of mechanochemically synthesized blue-green luminescent alkyl-passivated silicon nanoparticles," Chemical Engineering Journal 172, 2011, 591-600.
Wan et al., "Covalent Organic Frameworks with High Charge Carrier Mobility," Chem. Mater. 2011, 23, downloaded from http://yaghi.berkeley.edu/pdfPublications/11-cofhighcharge.pdf, pp. 4094-4097.
Wang et al., "A novel composite containing nanosized silicon and tin as anode material for lithium ion batteries," Electrochimica Acta 2009, 54, 4662-4667.
Wang et al., "A novel nanosized silicon-based composite as anode material for high performance lithium ion batteries," Electrochimica Acta 2011, 56, 1512-1517.
Wang et al., "Development and characterization of a novel silicon-based glassy composite as an anode material for Li-ion batteries," Solid State Ionics 2011, 192, 330-334.
Wang et al., "Self-healing chemistry enables the stable operation of silicon microparticle anodes for high-energy lithium-ion batteries," Nature Chemistry, 2013, vol. 5, pp. 1042-1048.
Xin et al., "A 3D porous architecture of Si/graphene nanocomposite as high-performance anode materials for Li-ion batteries," Journal of Materials Chemistry, 2012, 22, 7724-7730.
Yao, Y. et al., "Interconnected silicon hollow nanospheres for lithium-ion battery anodes with long cycle life," Nano Letters 2011, 11, pp. 2949-2954.
Yen et al., "Sputtered copper coating on silicon/graphite composite anode for lithium ion batteries," Journal of Alloys and Compounds 2014, 598, 184-190.
Zhang et al., "Interweaved Si@C/CNTs&CNFs composites as anode materials for Li-ion batteries," Journal of Alloys and Compounds 2014, 588, 206-211.
Zhao et al., "In-Plane Vacancy-Enebled High-Power Si-Graphene Composite Electrode for Lithium-Ion Batteries," Advanced Energy Materials, 2011, 1, 1079-1084.
Zhou et al., "Si/TiSi2 Heteronanostructures as High-Capacity Anode Material for Li Ion Batteries," Nano Lett., 2010, vol. 10, pp. 860-863.
Zhou et al., Spin-Coated Silicon Nano-article/Graphene Electrode as a Binder-Free Anode for High-Performance Lithium-Ion Batteries, Nano Res. 2012, 5(12) pp. 845-853.
Zhu et al., "Directing Silicon—Graphene Self-Assembly as a Core/Shell Anode for High-Performance Lithium-Ion Batteries," Langmuir, 2013, 29, 744-749.
International Search Report and Written Opinion for Application No. PCT/US2018/025492 dated Jul. 5, 2018 (17 pages).
International Preliminary Report on Patentability for Application No. PCT/US2018/025492 dated Oct. 10, 2019 (6 pages).
U.S. Appl. No. 17/238,005, filed Apr. 22, 2021, by Newbound et al.
U.S. Appl. No. 16/273,329, filed Feb. 12, 2019, by Newbound et al.

* cited by examiner

PRECHARGED NEGATIVE ELECTRODE MATERIAL FOR SECONDARY BATTERY

CROSS-REFERENCE TO RELATED APPLICATIONS

This application claims priority to U.S. Provisional Patent Application No. 62/479,444, filed Mar. 31, 2017, which is incorporated herein by reference in its entirety.

TECHNICAL FIELD

The present disclosure generally relates to the formation of precharged negative electrode active material for use in secondary batteries. The precharged negative electrode material comprises an alloy of a Group IVA element, a protective layer or shell covering a particle of the alloy, and an alkali metal that is contained within the protective shell. Described herein are methods of formation, architectural concepts, and improved performance in secondary battery devices.

BACKGROUND

High capacity lithium (Li) alloying materials such as Group IVA elements (Si, Ge, Sn) have been used as active materials in Li-ion battery (LIB) negative electrodes. Issues such as low first cycle Coulombic efficiency and subsequent cycle stability have slowed their widespread adaption. Thus, there is a need for improved Li alloying materials and methods for providing such materials.

SUMMARY OF THE INVENTION

The present disclosure describes novel synthetic methodologies and architectures of particles comprising lithiated Group IVA elements (silicon, germanium, or tin) (e.g., $Li_xSi_y$) alloy, passivated by a protective layer or shell comprised of hydrocarbons, carbon, or metal oxides designed for use as components of precharged negative electrode composites. These composites provide a means of including active Li material in the negative electrode during cell production (e.g., precharged or prelithiated cell). The inclusion of active lithium in the negative electrode offsets some of the lithium consumed during the first charge-discharge cycle due to solid-electrolyte interphase (SEI) formation, thus increasing the first cycle efficiency (FCE). The protective shell can also act as a barrier between the alloy core and the battery electrolyte during subsequent charge-discharge cycles, resulting in improved cycle stability. While silicon is exemplified to represent a Group IVA Li-active material used in negative electrodes, it is understood that the alloy core may comprise any of the Group IVA elements and these Group IVA materials could also be active in other secondary batteries such as sodium-ion batteries and nickel-hydride batteries.

In one aspect, provided are methods of producing a negative electrode, comprising: a) comminuting Li-Group IVA alloy particles in a solvent to a desired particle size distribution range; b) exposing surfaces of the Li-Group IVA alloy particles to at least one monomer or polymer surface modifier present during the comminution process; c) the at least one surface modifier forming at least one continuous coating on at least one of the exposed surfaces of the Li-Group IVA alloy particles; d) removing the solvent; and e) adding the surface-modified Li-Group IVA alloy particles to a negative electrode material by a coating process.

In another aspect, provided are prelithiated negative electrodes made by the disclosed methods.

In another aspect, provided are Li-Group IVA alloy particles having a surface area coated by at least one surface modifier, the at least one surface modifier comprising a polymer additive or a monomer additive.

BRIEF DESCRIPTION OF THE FIGURES

FIG. 8C: PAN treated with oleamide).

FIG. 9C: PFO treated with MWCNT).

DETAILED DESCRIPTION

Figure 1:
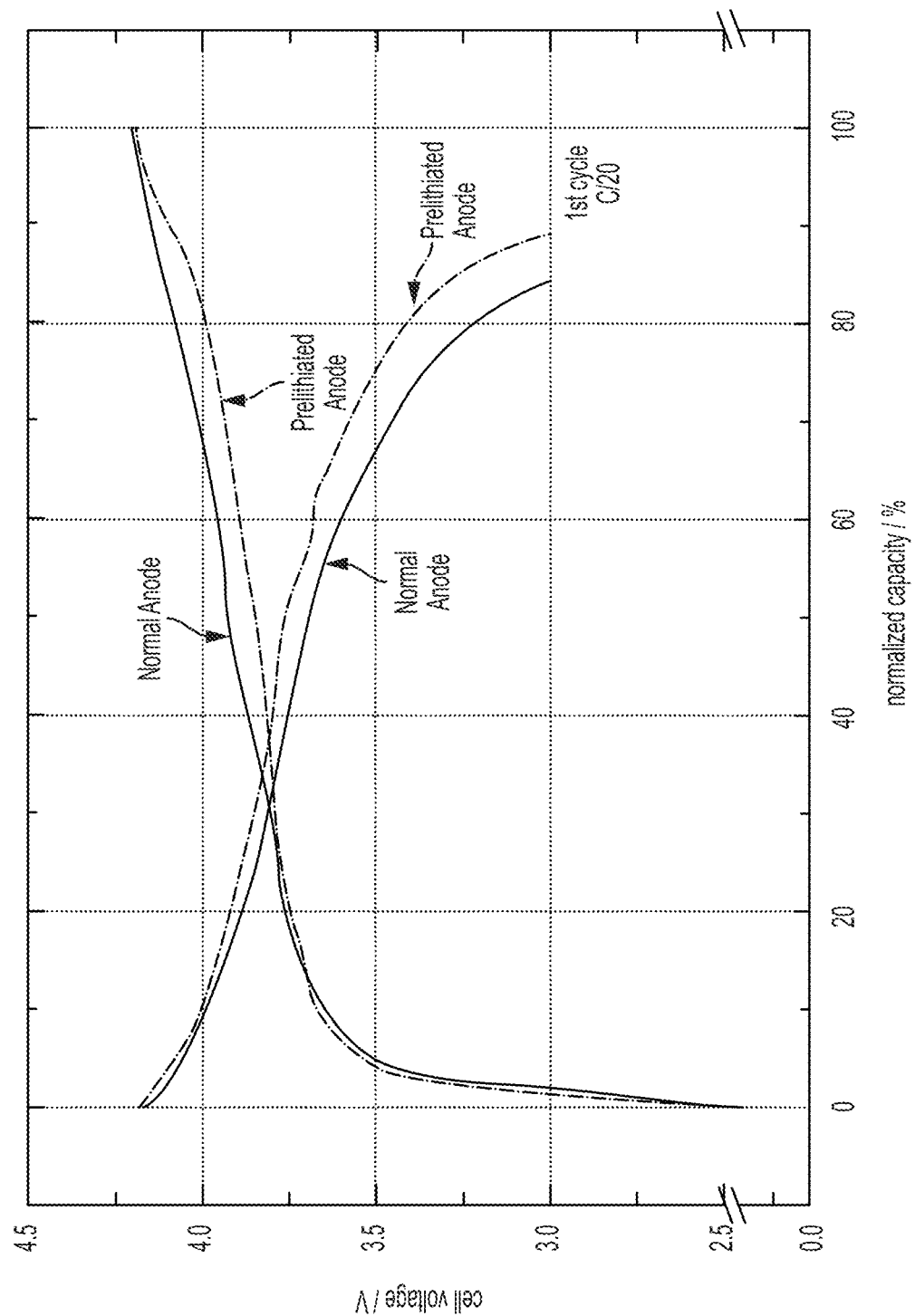
FIG. 1 shows a first Charge-Discharge plot comparison between a negative electrode made from a coated Li Si alloy made using the method of the present disclosure (a surface modified (SM) silicon/pre-lithiated compound (SM-Si/Li) denoted as a prelithiated laminate (green line)) and a negative electrode made by non-prelithiated laminate (blue line). The First Cycle Efficiency (FCE) without prelithiation is 83.5% vs. with prelithiation the FCE is 90%.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Before any Li-ion rechargeable battery becomes functional for general use, it has undergone a lengthy process called formation. In this procedure, the battery is both charged and discharged in a very precise manner to control the initial chemical reactions with lithium. Many of these reactions are irreversible and permanently decrease the battery's available energy. Moreover, this process consumes lithium that is typically supplied by the cathode, which is the most expensive active electrode material in the battery. The formation process increases manufacturing time and negatively impacts the leverage from investments in manufacturing plants and equipment. If one could reduce or eliminate this formation process, margins would increase, time to market would decrease, and the overall cost of Li-ion batteries would be substantially reduced.

Researchers have tried to compensate for the lithium depletion in this formation process by adding extra lithium to the battery negative electrode (e.g., the anode in the discharging state of a battery) in a process called prelithiation. Prelithiation is very appealing because, unlike many standard battery improvement techniques which fight for a fraction-of-a-percent performance increase, any percentage gain from prelithiation is gained as a 1:1 ratio toward overall battery energy density.

One such electrochemical method involves building a pseudo-battery, charging the negative electrode to a given capacity, and then building a new battery with the pre-lithiated negative electrode. This process adds additional manufacturing steps, as well as capital equipment, and requires inert atmospheres—all of which can hinder commercialization.

Another method incorporates metallic lithium particles into the negative electrode. However, these lithium particles are incompatible with aqueous slurry mixing techniques so they must be applied after electrode casting/drying in a separate process. This increases manufacturing complexity and costs, limiting widespread adoption. Ideally, prelithiation should be compatible with industrial standard aqueous electrode slurry processing and not introduce additional processing steps.

Prelithiated negative electrode materials could offset some amount of the irreversible capacity loss in the formation cycle process with the inclusion of supplemental Li in the negative electrode prior to the formation cycles. Given that the positive electrode active material typically has even lower gravimetric capacity to accommodate lithium compared to graphite in negative electrodes (220 vs. 374 mAh/g, respectively) and factoring in the higher costs for the metal oxide active materials that comprise positive electrode active materials, there is strong impetus for discovering ways to incorporate supplemental lithium beyond the lithium initially supplied by the positive electrode.

Several approaches for prelithiation have been reported, but none have yet resulted in a viable commercial product or process that could be adapted by LIB manufacturers. There are several stable phases of $Li_xSi$ (where x=1 to 4.25) that could be synthesized thermochemically to make alloys or crystalline phases (herein generally referred to as LiSi alloy). Some of these alloys (preferably those with crystalline character) have been prepared as powders by mechanical milling. For example, Iwamura, S. et al. (Sci. Rep. 5, 8085; DOI:10.1038/srep08085 (2015)) have reported negative electrodes prepared with $Li_{21}Si_5$ alloys by mechanical milling. They claimed that $Li_{21}Si_5$ is so reactive that it could not be combined directly with polymer binders without degrading the mixture unless the alloy was first passivated with carbon. The passivation of $Li_{21}Si_5$ particles by carbon black only prevented detrimental severe reactions with polymer binders; it did not passivate the particles toward reactions with water and air.

Other methods of prelithiation by application of stabilized lithium metal powder (SLMP; Nano Lett. (2013), 13, 4158-4163) also in R. W. Grant (US2014/0310951); this lithium powder applied to the electrode laminate after it has been produced is not readily integrated with battery manufacturers' processes. A prelithiation process claimed by Zhamu et al. (U.S. Pat. No. 8,158,282) to be economically viable involves galvanic charging of the electrode prior to assembling the cells. However, so far, this process has not been adapted by the industry. In summary, no commercially viable processes have yet emerged from these efforts. Thus, there is a need for a prelithiation method that can be applied in commercial production lines for negative electrodes.

The inventors of the present application have previously developed a flexible, scalable process (US 2013/972,575, which is incorporated by reference herein in its entirety) to produce sub-micron surface-modified particles of Group IVA elements (US 2013/972,382, which is incorporated by reference herein in its entirety, and US 2015/0243973, which is incorporated by reference herein in its entirety). By employing this general mechanochemical process, it is possible to produce micron or sub-micron particles with a LiSi alloy core encased by a protective shell, hereafter called c-LiSi alloy (the "c" does not signify "crystalline"). This protective shell could function much like an artificial SEI layer.

The Si-based core alloy particles with protective shell coverings can be formed from top-down comminution methods by employing ball milling or bead media milling methodology. One advantage of using bead media mills is that the multiple consecutive steps can easily be employed during a single overall process, which allows the flexibility to use a wide range of reactive agents from which to build covalently bonded coatings. These reactive agents could be introduced in the form of solids (crystalline or amorphous), liquids, gas, monomers or polymers, neat or in solution with a diverse range of solvents. Media mills also offer the advantage of processing selected reagents together in a stirred circulated slurry that is easily scaled up to make commercial production quantities economically.

A stepwise or multi-step comminution process allows flexibility to add reagents to the process slurry or to change comminution conditions at any time during the process period; any one of these events may constitute a "process step". Stepwise mechanochemical processing of silicon and related alloys of silicon can be shown to produce sub-micron particles with coherent covalently bonded protective coatings. Stepwise processing may also allow for greater control of the particle size distribution of the particles, leading to better product yield and overall efficiency of the process.

The protective shell allows for safe handling of the c-LiSi alloy particles in air and aqueous environments. Both Li and Si react exothermically with water and will quickly oxidize in air. The shell impedes the diffusion of oxygen and water to the reactive LiSi alloy core. This allows the c-LiSi alloy particles to be safely combined with binders and other components of the negative electrode composite in common commercial slurry production processes used in conventional LIB manufacturing.

The c-Li Si alloy also increases the cycle stability of the LIB. Si and other Group IVA elements are known to undergo large volume expansion upon the formation of the Li alloy during electrochemical lithiation/delithiation (i.e. cycling). The volume expansion causes physical break down of the SEI layer which leads to capacity loss because Li is consumed to form new SEI. However, the protective shell is an inactive barrier and does not undergo significant volume change during cycling. Therefore, as long as the protective shell remains unbroken, allows $Li^+$ ion mobility through the barrier, and allows conduits for electron conductivity to the current collector, no Li is consumed during lithiation and delithiation leading to higher overall Columbic efficiencies and cycle life.

This disclosure describes how to produce c-LiSi alloy particle architectures with protective coatings designed to enhance the performance of LIB negative electrodes. An emphasis of novel stepwise mechanochemical processing discloses methods that enable feasible scale-up to commercially viable production of coated micron to submicron particles. Also, various methods of c-LiSi alloy passivation are described in which polymer coatings were applied and the products tested for their reactivity in aqueous binder slurries. It should be understood that Ge and Sn or some combination of Si, Ge, and Sn could also be used to form alloys with Li and would function similarly as LIB negative electrodes. There are several possible methods in which these materials can be combined to create a composite material with the attributes of each component while also gaining synergies that the individual components lack by themselves.

1. Definitions

Unless otherwise defined, all technical and scientific terms used herein have the same meaning as commonly understood by one of ordinary skill in the art. In case of conflict, the present document, including definitions, will control. Preferred methods and materials are described below, although methods and materials similar or equivalent to those described herein can be used in practice or testing of the present invention. All publications, patent applications, patents and other references mentioned herein are incorporated by reference in their entirety. The materials, methods, and examples disclosed herein are illustrative only and not intended to be limiting.

The terms "comprise(s)," "include(s)," "having," "has," "can," "contain(s)," and variants thereof, as used herein, are intended to be open-ended transitional phrases, terms, or words that do not preclude the possibility of additional acts or structures. The singular forms "a," "and" and "the" include plural references unless the context clearly dictates otherwise. The present disclosure also contemplates other embodiments "comprising," "consisting of" and "consisting essentially of," the embodiments or elements presented herein, whether explicitly set forth or not.

The conjunctive term "or" includes any and all combinations of one or more listed elements associated by the conjunctive term. For example, the phrase "an apparatus comprising A or B" may refer to an apparatus including A where B is not present, an apparatus including B where A is not present, or an apparatus where both A and B are present. The phrase "at least one of A, B, . . . and N" or "at least one of A, B, . . . . N, or combinations thereof" are defined in the broadest sense to mean one or more elements selected from the group comprising A, B, . . . and N, that is to say, any combination of one or more elements A, B, . . . or N including any one element alone or in combination with one or more of the other elements, which may also include, in combination, additional elements not listed.

The modifier "about" used in connection with a quantity is inclusive of the stated value and has the meaning dictated by the context (for example, it includes at least the degree of error associated with the measurement of the particular quantity). The modifier "about" should also be considered as disclosing the range defined by the absolute values of the two endpoints. For example, the expression "from about 2 to about 4" also discloses the range "from 2 to 4". The term "about" may refer to plus or minus 10% of the indicated number. For example, "about 10%" may indicate a range of 9% to 11%, and "about 1%" may mean from 0.9-1.1. Other meanings of "about" may be apparent from the context, such as rounding off, so, for example "about 1" may also mean from 0.5 to 1.4.

For the recitation of numeric ranges herein, each intervening number there between with the same degree of precision is explicitly contemplated. For example, for the range of 6-9, the numbers 7 and 8 are contemplated in addition to 6 and 9, and for the range 6.0-7.0, the number 6.0, 6.1, 6.2, 6.3, 6.4, 6.5, 6.6, 6.7, 6.8, 6.9, and 7.0 are explicitly contemplated.

The term "beginning of comminution" and variants thereof, as used herein, refers to the moment when the mechanochemical processing has started. This may be the moment when enough mechanical energy is supplied to the media to begin measurably reducing the particle size of the Group IVA particles.

The term "during comminution" and variants thereof, as used herein, refers to the period between the beginning of comminution and the end of comminution.

The term "end of comminution" and variants thereof, as used herein, refers to the moment when the mechanochemical processing has ended. In a bead mill (but not a SPEX ball mill), for example, comminution could be ended by reducing agitator speed such that the mechanical energy supplied to the media is not enough to measurably fracture the Group IVA particles (e.g., below about 3000 rpm). Although the slurry would continue to stay fluidized in this example (i.e., preventing agglomeration of small particles and keeping particles from separating from the solvent), no significant amount of comminution would take place.

2. Methods of Producing a Negative Electrode

Disclosed herein are methods of producing negative electrodes. In particular, disclosed are methods of producing micron or submicron scale Li-Group IVA alloy with an inactive coating. The methods can include comminuting Li-Group IVA alloy particles in a solvent to a desired particle size distribution range. The Li-Group IVA alloy can be a LiSi alloy. Other Li alloys can also be used with the methods of the present disclosure, including LiGe, LiSn, or other combinations of Si, Ge, and Sn with Li to form an alloy. An exemplary alloy is $Li_{15}Si_4$.

The solvent may be any suitable solvent that allows comminuting of the Li-Group IVA alloy particles. For example, the solvent may be a saturated alkane. In some embodiments, the solvent may be selected from the group consisting of cycloalkanes, hexanes, heptanes, octanes, cyclohexanes, and any other saturated alkane. The progress of the comminution can be monitored by particle size distribution measurements and/or by monitoring slurry temperatures, viscosity, and power input. In some embodiments, a LiSi alloy is used as a feedstock for wet milling processes in alkane or cycloalkane solvents such as hexanes, heptanes, octanes, cyclohexanes, or any saturated alkane solvents.

In some embodiments the Li-Group IVA alloy is milled in the presence of hydrogen provided in a forming gas. The hydrogen/noble gas mixtures can be used in combination with an inert alkane solvent (as described above) during the comminuting step. A forming gas is an industrial gas comprised of inert noble gas blended with typically 5 mol % $H_2$ or less, such as equal to 5% $H_2$ or less, equal to 4% $H_2$ or less, equal to 3% $H_2$ or less, equal to 2% $H_2$ or less, or equal to 1% $H_2$ or less. Forming gas can be used in the place of purified argon to blanket the slurry during comminution. Molecular hydrogen can be reactive toward silicon surfaces. It can also migrate into silicon and other metals as atomic hydrogen and can form LiH on the surface of Li-Group IVA alloy particles. $H_2$ is also known to cap (e.g., passivate) Si surfaces by forming Si—H bonds with "dangling" Si bonds created from fracturing Si particles. This condition may be preferred when it is desired to produce Li-Group IVA alloy particles to suppress oxide formation.

The Li-Group IVA alloy particle size distribution can be reduced to a desired PSD range by mechanical milling (e.g., comminution). The Li-Group IVA alloy may be comminuted to a PSD of about 1,000 nm to about 44,000 nm, such as about 10 nm to about 1,000 nm, or about 400 nm to about 600 nm. In certain embodiments, the PSD range can be controlled through a step-wise comminution process.

Depending on the desired particle size distribution (PSD) range of the Li-Group IVA alloy particles, comminution conditions can be chosen from a combination of parameters that anyone skilled in the art of comminution will be able to select. Agitator speeds and other conditions during comminution are chosen depending on the size of the mill, batch size, milling bead selection, solids loading, solvent selection circulation rate, and secondary reagents employed. In some embodiments, comminution includes the use of an agitator speed of about 2 m/s to about 45 m/s for varying amounts of time, such as from about 15 minutes to about 1200 minutes.

The milling bead may be any suitable bead that allows comminution to take place as disclosed herein. In some embodiments, the milling bead is a ceramic bead, such as a hard ceramic bead. The milling bead may have a diameter from about 100 microns to about 1000 microns, such as from about 200 microns to about 800 microns or from about 300 microns to about 700 microns. In some embodiments, the Li-Group IVA alloy is milled by a circulating bead mill.

In some embodiments, Li- or Na-organic complexes may be used with any source of Li-active Group IVA elements (e.g., solar grade Si or Ge wafer kerf or metallurgical silicon) to prepare Group IVA particles with partial insertion (prepared in-situ and added during the comminution process) of the alkali metals. For example, polycyclic aromatic (PA) compounds such as pyrene, perylene, and naphthalene can form ion-paired $Li^+PA^-$ complexes that can deliver Li to the Group IVA particle during comminution. Accordingly, in some embodiments, the Li-organic or the Na-organic complex is a polycyclic aromatic compound, such as pyrene, perylene, naphthalene, or combinations thereof.

The $Li^+PA^-$ complexes (e.g., polycyclic aromatic compounds) described above can also function as an electrolyte in an appropriate solvent (such as gamma butyrolactone) whereupon a current can be applied to a cell with Li foil as the counter electrode and with a Si/graphite electrode laminated on a Cu current collector as the working electrode. The Si particles in the Si/graphite electrode will undergo Li insertion. This electrode laminate is then partially charged with Li and can be used to make a battery with a partially charged negative electrode.

In certain embodiments, the electrode laminate has the negative electrode composite spread on a copper current conductor read to cut into electrodes.

In some embodiments, the Li-Group IVA alloy particles are formed during comminution from Li-active solar grade Si wafer kerf, Li-active solar grade Ge wafer kerf, and/or Li-active metallurgical silicon.

A. Surface Modifiers

The method can include exposing surfaces of the Li-Group IVA alloy particles to at least one surface modifier present during the comminution process. Highly reactive surfaces of the Li-Group IVA alloy that are exposed on the fractured Li-Group IVA alloy particles can form covalent bonds to the surface modifier present during the comminution process. In some embodiments, the surface modifier comprises a polymer additive or a monomer additive. In some embodiments, the polymer additive or the monomer additive covalently bonds to the surfaces of the Li-Group IVA particles. The polymer additive may comprise at least one of polystyrene, polyacrylonitrile, polyacrylic acid, lithium polyacrylate, polyaniline, polyethylene oxides, polyethylene glycol, polyamides, polyaramides (paramides and metamides), or a combination thereof.

The surface modifier may be monomers with functional groups that react with the Li-Group IVA alloy particle surfaces or with the polymer to form chemical bonds. Because Li-Group IVA alloy is so reactive, almost any organic compound with heteroatoms and/or unsaturated bonds are potential surface modifiers. The monomer additive may comprise at least one of alkenes, alkynes, aromatics, heteroaromatics, cycloalkenes, alcohols, glycols, polyglycols, ethers, polyethers, thiols, disulfides, amines, amides, pyridines, pyrroles, imides, imidazoles, imidazoline, furans, thiophenes, nitriles, cyanates, isocyanates, isothiocyanates, ketones, carboxylic acids, esters, amino acids, aldehydes, acrylates, methacrylates, oxylates, organic carbonates, lactones and gases, $H_2$, $O_2$, $CO_2$, $N_2O$, HF, and fluorinated analogs thereof when applicable. Various fluorinated analogs of these compounds can also be used such as trifluoroacetone, bis(2,2,2-trifluoroethyl) carbonate, 2,2,2-trifluoroethyl acrylate, 2,2,2-trifluoroethyl methacrylate and 1,3,5-trifluorobenzene. The monomer additive may also comprise combinations of the foregoing monomers.

The at least one surface modifier can form at least one continuous coating on at least one of the exposed surfaces of the Li-Group IVA alloy particles. The continuous coating can act as a protective shell on the surface of the Li-Group IVA alloy particles. The coating can cover all of the exposed surfaces, and the coating can have a thickness of about 2 nm to about 500 nm. Generally, the thickness of a surface layer or layers will impact electrode performance differently depending on the coating porosity. Typically though, the thickness of the surface coating on a nanoparticle is less than about 10 nm.

The coating may be derived from the polymer additive or the monomer additive, thereby forming a polymer coating. The polymer coating may be thermally processed or crosslinked with added reagents, which can all form part of the protective shell. In some embodiments, the continuous coating comprises a polymer surface modifier and is thermally processed or crosslinked with a reagent.

In some embodiments, the Li-Group IVA alloy is milled by a circulating bead mill in an alkane solvent (including but not limited to cycloalkane solvents, hexanes, heptanes, octanes, cyclohexanes, or any saturated alkane solvents) with a polymer additive (including but not limited to polystyrene, polyacrylonitrile, polyacrylic acid (and its neutral Li salt), and polyaniline). Alternately or additionally, polymer coatings may be added post-milling (e.g., after the end of comminution) on top of Li-Group IVA alloy particles with any surface coatings that were applied during comminution processing.

In some embodiments, the Li-Group IVA is milled in the presence of a metal-oxide or a metal-alkoxide reagent, e.g., in an inert alkane solvent. Metal alkoxides constitute an important class of compounds often used in sol-gel processes. They are characterized by the metal-oxygen-carbon bonding system including such metals as magnesium, aluminum, titanium, zinc, or lithium. Metal alkoxides in particular have proven to be especially beneficial during comminution as they can modify particle surfaces to keep particles well suspended in the slurry with alkane solvents. Some examples of metal oxides include, but are not limited to, $Al_2O_3$, $TiO_2$, $Li_4Ti_5O_{12}$, MgO, NiO, and borates. In some embodiments, the metal alkoxide is selected from the group consisting of magnesium alkoxides, aluminum alkoxides, titanium alkoxides, zinc alkoxides, lithium alkoxides, and combinations thereof. If required, subsequent curing of the Li-Group IVA can form a protective shell comprised of metal oxides that can sufficiently impede ingress of solvents to the Li-Group IVA particle core.

In some embodiments, inorganic carbon (non-hydrocarbon) surface modifiers can be added at some stage during or following comminution of the Li-Group IVA alloy and allowed to contact and form covalent bonds to highly reactive sites on newly fractured surfaces of the Li-Group IVA alloy particles. For example, the inorganic carbon surface modifiers can be present at the beginning of the comminution process, or added after most of the particle size reduction has taken place but while surfaces are still reactive (e.g., while there are still non-passivated sites). Inorganic carbon surface modifiers may be comprised from the group: carbon nanotubes (SWCNT (single wall carbon nanotubes), MWCNT (multi-wall carbon nanotubes)), nanospherical carbon, fullerenes, graphene, graphite, carbon black, or any combination thereof. Optionally other hydrocarbons (monomers or polymers) may be added to help provide complete coverage of the Li-Group IVA alloy particle surface and provide passivation of the Li-Group IVA alloy particle from reactive solvents. Accordingly, in some embodiments, the surface modifier comprises a polymer additive, a monomer additive, an inorganic surface modifier, or a combination thereof.

In addition, the surface modifier can comprise a Li salt. In some embodiments, Li salts (e.g., selected from the group LiF, $Li_2O_2$, $Li_2CO_3$, $LiBH_4$, $LiBF_2(C_2O_4)$, $Li_2(C_2O_4)$, and combinations thereof) can be added during comminution of the Li-Group IVA alloy alone or with other surface modifiers that can be heat processed and cured as described above to form a protective shell from a covalently bonded continuous layer of the additives that can impede ingress of solvents, but will allow $Li^+$ ion mobility and can facilitate electrical charge transfer from the particle Li-Group IVA alloy core to the electrode current collector.

Surface modifiers may be applied to the particles, which can induce aggregation of the nanoparticles into micron-sized clusters. Grain structure in the micron-sized clusters is created from the coatings on the nanoparticles. These coatings can be heat-processed (e.g., cured) to form tight porous covalently bonded masses of carbon and metal oxides in grains between the Li-Group IVA alloy core nanocrystals. This architecture can be formed by spray-dried slurries or by allowing coated particle agglomeration into micron-sized particles.

The same coating that resides in grains between the Li-Group IVA alloy nanocrystals can form a continuous protective shell around the micron-sized cluster that can impede ingress of solvents, but can allow $Li^+$ ion mobility and facilitates electrical charge transfer from the Li-Group IVA alloy particle core to the electrode current collector. The surface modifiers used in this process of making aggregated Li-Group IVA alloy clusters could be any of the organic reagents, metal oxides, or metal alkoxides disclosed herein.

The method can further include removing the solvent (e.g., milling solvent) used during comminuting Li-Group IVA alloy particles. The milling solvent can be removed by an evaporation process. This can be accomplished by any number of methods known to the art, such as spray drying or evaporation under reduced pressure in a suitable atmosphere.

Optionally, the coated particle can be heated. The coated Li-Group IVA alloy particles can be heated prior to removal of the solvent, during solvent removal, after solvent removal, or any combination thereof. For example, the Li-Group IVA alloy particles with continuous coatings can be heated from about 200° C. to about 1200° C. for about 30 minutes to about 24 hours under a suitable gas (including but not limited to air, Ar, or $Ar/H_2$) or in a vacuum to cure the protective shell. Curing is considered to be a partial to complete carbonization of the hydrocarbon mass on the Li-Group IVA alloy surfaces. Heating temperatures and durations will depend on what coatings are used to form a protective shell.

The heating process can accomplish different things. For example, heating to about 80° C. may be required to dehydrate or remove residual solvent. Heating can also initiate a curing process (such as cross-linking). Higher temperatures (e.g., 600 to 1200° C.) may be required to form certain carbon structures.

In certain embodiments, the Li-Group IVA alloy particles can be produced with a narrow particle size distribution. In certain embodiments, the Li-Group IVA alloy particles can be produced with a single particle size distribution peak having a full width at half maximum (FWHM) of less than about 1000 nm, less than about 900 nm, less than about 800 nm, less than about 700 nm, less than about 600 nm, less than about 500 nm, less than about 400 nm, less than about 300 nm, less than about 200 nm, or less than about 100 nm.

In certain embodiments, the Li-Group IVA alloy particles can be produced in a high yield of greater than about 50%, greater than about 60%, greater than about 70%, greater than about 80%, greater than about 85%, greater than about 90%, greater than about 95%, greater than about 96%, greater than about 97%, greater than about 98%, greater than about 99%, greater than about 99.5%, or greater than about 99.9% of the theoretical maximum yield. Additionally, no separation process steps (e.g., filtration or chromatography) may be needed to obtain the high yield.

In certain embodiments, a narrow particle size distribution and a high yield can be obtained simultaneously, such as less than about 300 nm FWHM and a greater than about 95% yield, for example.

The resulting coated Li-Group IVA alloy material can then be added to conventional LIB negative electrode composites using conventional coating processes known in the art. Examples include, but are not limited to, the addition of carbon black, graphite, or other additives used with aqueous binder systems in conventional negative electrode slurries, or non-aqueous binder systems such as NMP/PVdF. In some embodiments, the coating process is performed by addition of any additive used with non-aqueous binder systems in conventional Li ion battery production.

The method may further comprise a step of incorporating a negative electrode material into a slurry production process for producing a negative electrode for a battery.

Also disclosed herein are prelithiated negative electrodes provided by the disclosed methods.

3. Particles

Also disclosed herein are particles provided by the disclosed methods. The particle may be a Li-Group IVA alloy particle having a surface area coated by at least one surface modifier, the at least one surface modifier comprises a polymer additive or a monomer additive. The Li-Group IVA alloy particles can comprise LiSi, LiGe, LiSn, or Li and a combination of Si, Ge, or Sn together or in any combination. The surface modifiers may be any of the surface modifiers as described above.

In some embodiments, the polymer is selected from the group consisting of polystyrene, polyacrylonitrile, polyacrylic acid, lithium polyacrylate, and polyaniline. In some embodiments, the monomer additive is selected from the group consisting of alkenes, alkynes, aromatics, heteroaromatics, cycloalkenes, alcohols, glycols, polyglycols, ethers, polyethers, thiols, disulfides, amines, amides, pyridines, pyrroles, imides, imidazoles, imidazoline, furans, thiophenes, nitriles, cyanates, isocyanates, isothiocyanates, ketones, carboxylic acids, esters, amino acids, aldehydes, acrylates, methacrylates, oxylates, organic carbonates, lactones and gases, $H_2$, $O_2$, $CO_2$, $N_2O$, HF, and fluorinated analogs thereof when applicable.

Is some embodiments, the particles may retain their crystallinity during comminution. In other embodiments, it is desirable for the Li-Group IVA alloy particles to be partially or completely amorphous (see Example 6). In certain embodiments, the relative amount of crystallinity of the Li-Group IVA alloy particles can be controlled to a desired percentage, such as less than about 100%, less than about 95%, less than about 90%, less than about 85%, less than about 80%, less than about 75%, less than about 70%, less than about 65%, less than about 60%, less than about 55%, less than about 50%, less than about 45%, less than about 40%, less than about 35%, less than about 30%, less than about 25%, less than about 20%, less than about 15%, less than about 10%, less than about 5%, or about 0%, the remaining percentage being non-crystalline (i.e., amorphous).

4. Examples

Example 1

In an exemplary example, 325-mesh $Li_{15}Si_4$ (48:52 wt %) was prepared thermochemically as the feedstock for wet milling processes in alkane or cycloalkane solvents such as hexanes, heptanes, octanes, cyclohexanes, or any saturated alkane solvents with a boiling range well above the operation temperature of the milling slurry (typically from about 25° C. to about 60° C.). Depending on the desired PSD range of the LiSi alloy product, comminution conditions can be determined. Milling beads and materials were typically selected from hard ceramic materials. Beads ranging in diameter from 100 to 1000 microns, preferably 300 to 700 microns, were used. The agitator speeds during comminution were typically between 2 to 45 m/s for 1 to 1200 minutes residence time—preferably between 6 to 14 m/s for 15 to 100 minutes—depending on the size of the mill, batch size, bead selection, solids loading, solvent selection circulation rate, and secondary reagents employed.

Figure 4:
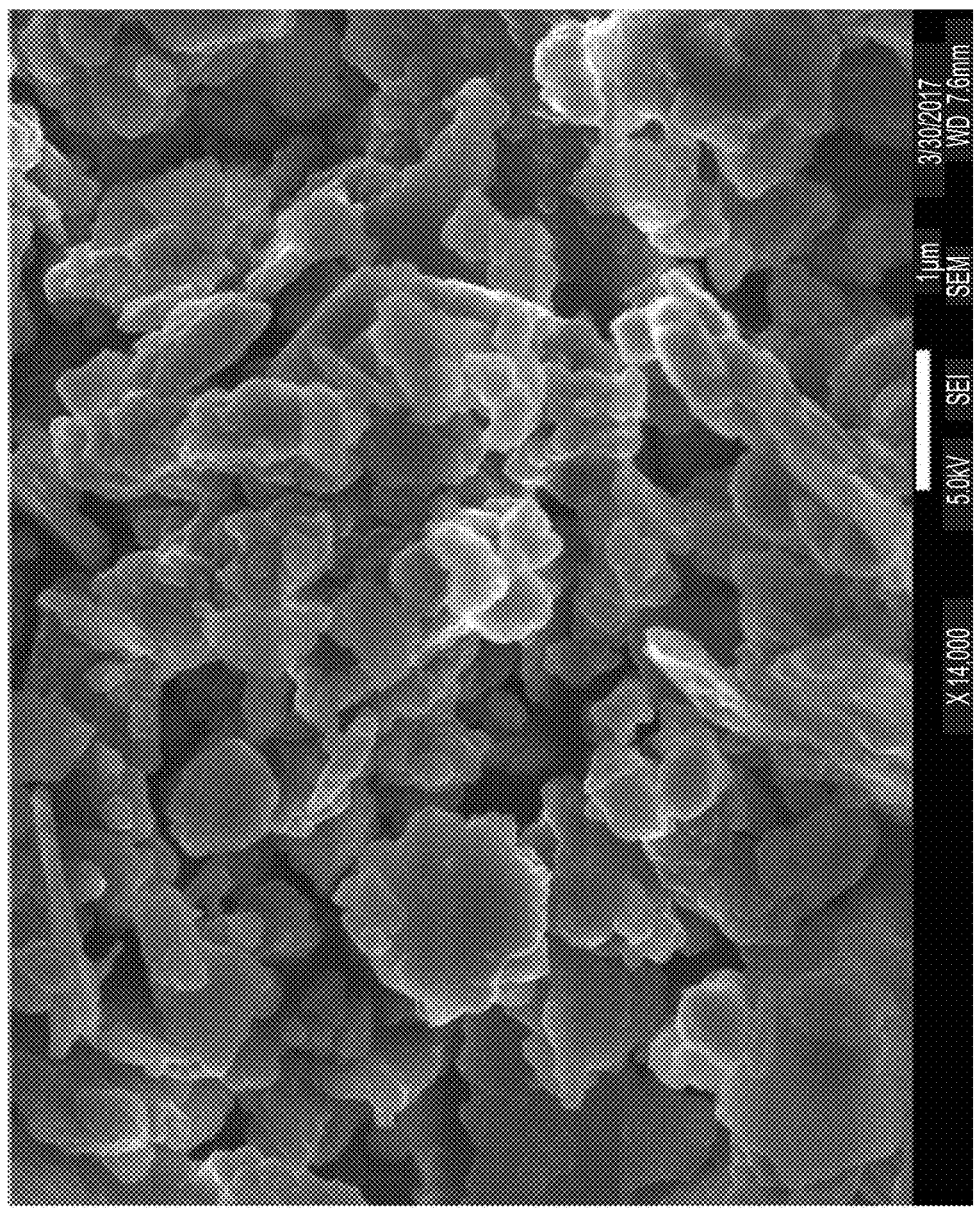
FIG. 4 shows scanning electron microscopy (SEM) images of prelithiated SM-Si/Li particles. The white shade on the particles indicates the presence of the uniform surface modifier coating.

FIG. 4 shows scanning electron microscopy (SEM) images of prelithiated SM-Si/Li particles made according to Example 1. The white shade on the particles indicates the presence of a uniform surface modifier coating.

Figure 5:
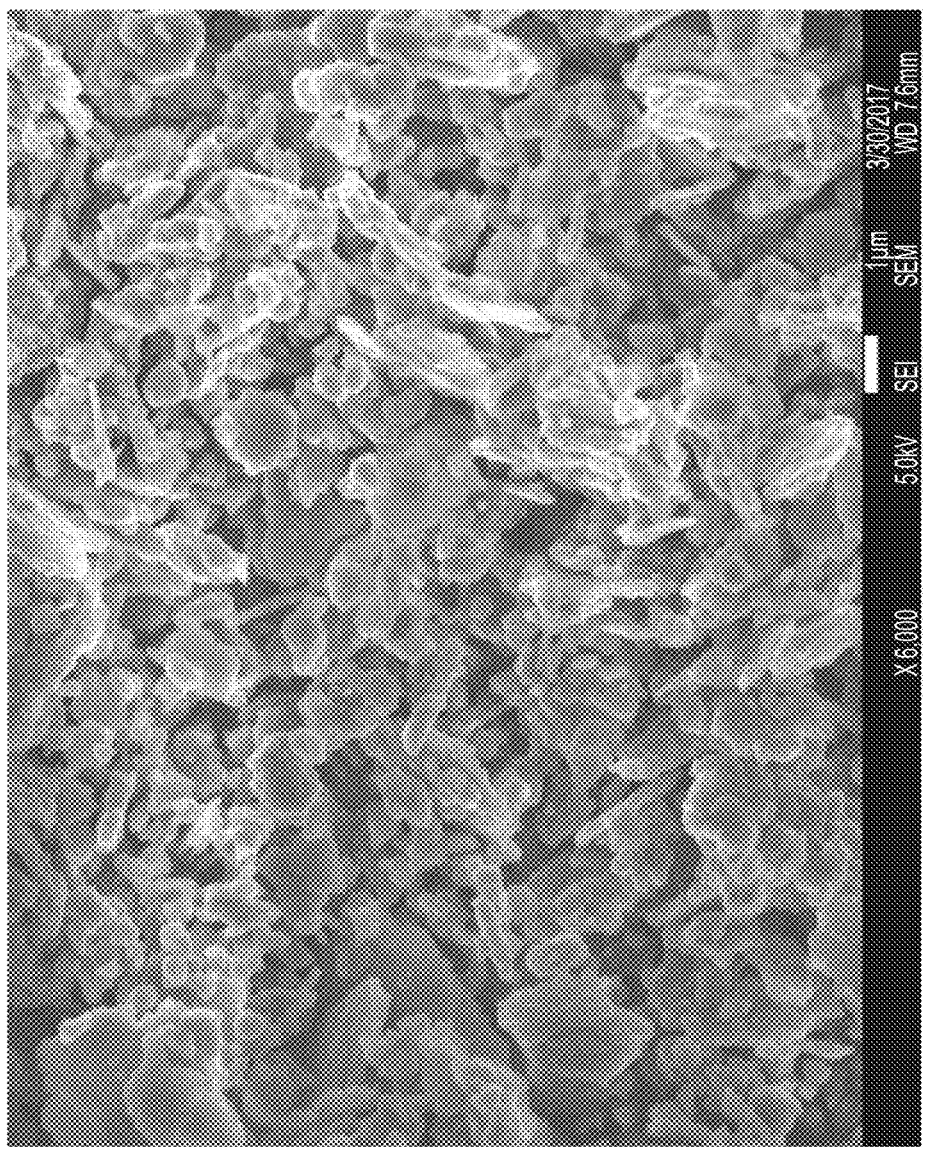
FIG. 5 shows SEM images of prelithiated SM-Si/Li particles. The white shade on the particles indicates the presence of the uniform surface modifier coating.

FIG. 5 shows SEM images of prelithiated SM-Si/Li particles made according to Example 1. The white shade on the particles indicates the presence of a uniform surface modifier coating.

Example 2

In another non-limiting example, $Li_{15}Si_4$ alloy was stirred under Ar for approximately 48 hours in a 5% polyacrylonitrile (PAN) solution in dimethylsulfoxide (DMSO). The weight equivalent ratio of LiSi to PAN was 7:3. The DMSO was stripped by vacuum distillation, and the remaining solids were dried for 6 hours under dynamic vacuum at approximately 80° C. The remaining solid was heated for 2 hours under Ar atmosphere to cure the protective coating. In an alternate embodiment, dimethylformamide (DMF) was used as the solvent in place of DMSO.

Example 3

Figure 2:
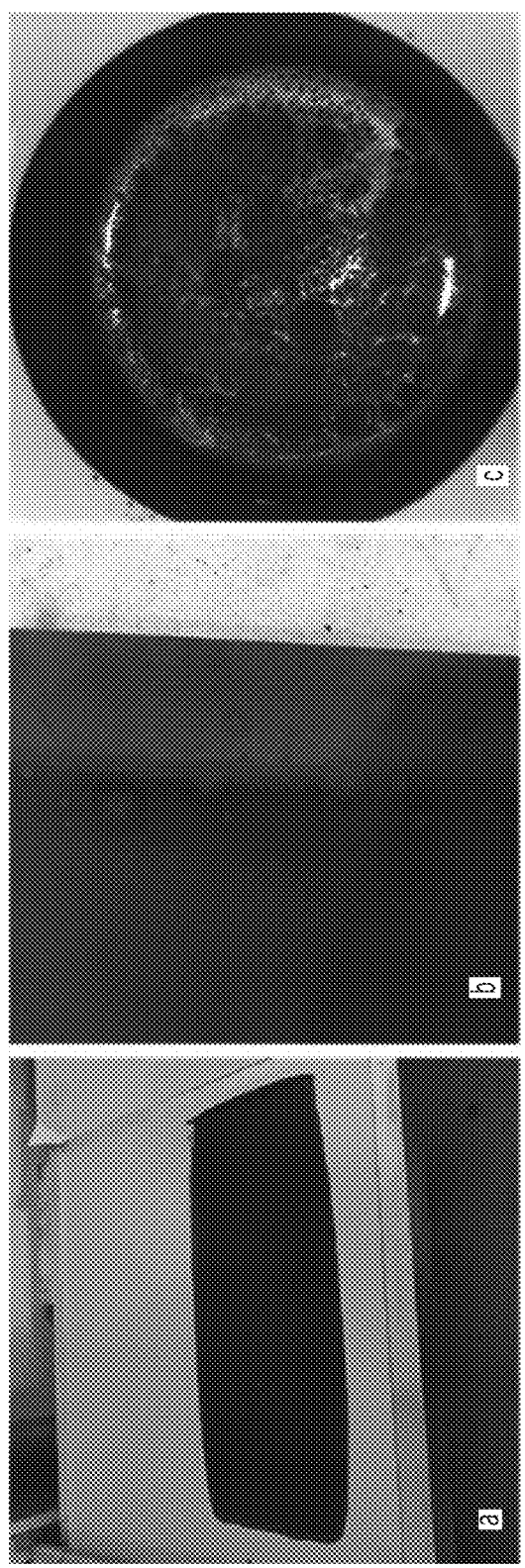
FIG. 2 shows images of laminate made in aqueous binder. Panel a) shows 5% prelithiated SM-Si/Li product with protected shell. Panel b) shows 5% prelithiated product with non-protected shell. Panel c) shows slurry of 5% prelithiated Si with non-protected shell. Comparing the panels shows the stability of prelithiated SM-Si/Li product in aqueous binder.
Figure 3:
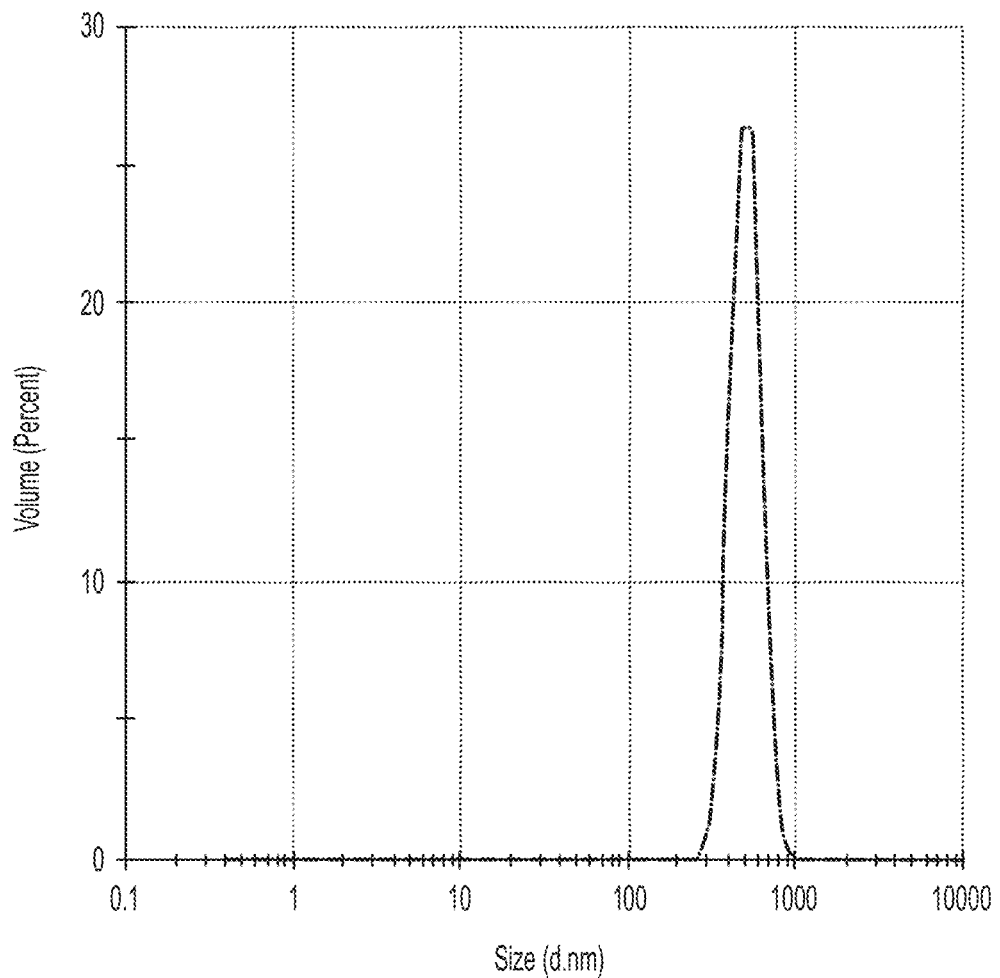
FIG. 3 shows a plot of particle size distributions of prelithiated SM-Si/Li particles. The $D_{50}$ is 500 nm. This plot shows a narrow size distribution of prelithiated SM-Si/Li particles.

Table 1 below shows several mass equivalents of reagents used for comminution compared with product yields of comminution process and heat processing steps. Table 1 (supplemented by FIG. 1, FIG. 2, and FIG. 3) demonstrates composition of matter of products after comminution and after heat treatment, as well as the processes disclosed herein.

TABLE 1

| Reagents | Reagent Mass Equivalent | Mass Yield Equivalent | Mass Equivalent after heat treatment |
| --- | --- | --- | --- |
| $Li_{15}Si_4$ | 4 | 13 | 13 |
| M(i-OPr)$_4$ | 1 | | |
| Alkane | 400 | | |
| $Li_{15}Si_4$ | 4 | 7 | 7 |
| Polyether | 1 | | |
| Alkane | 400 | | |

As per Table 1, yields after comminution, particularly with M(i-OPr)$_4$ are more than 200% of the LiSi alloy and the metal alkoxide reagents combined. This implies that the alkane solvent has become a substantial part of the protective shell that surrounds the LiSi alloy. This is also true to a lesser extent using polyethers. Subsequent heat treatment does not appear to change the total mass of material significantly even though any hydrocarbon trapped in the surface layer surrounding LiSi alloy is expected to degrade or carbonize.

Example 4

Methods of building covalently bonded layers on particles during comminution processes have been tested using polysilicon with no Li content so that the coating structures can be analyzed safely. The following exemplifies the importance of stepwise processing.

Figure 6:
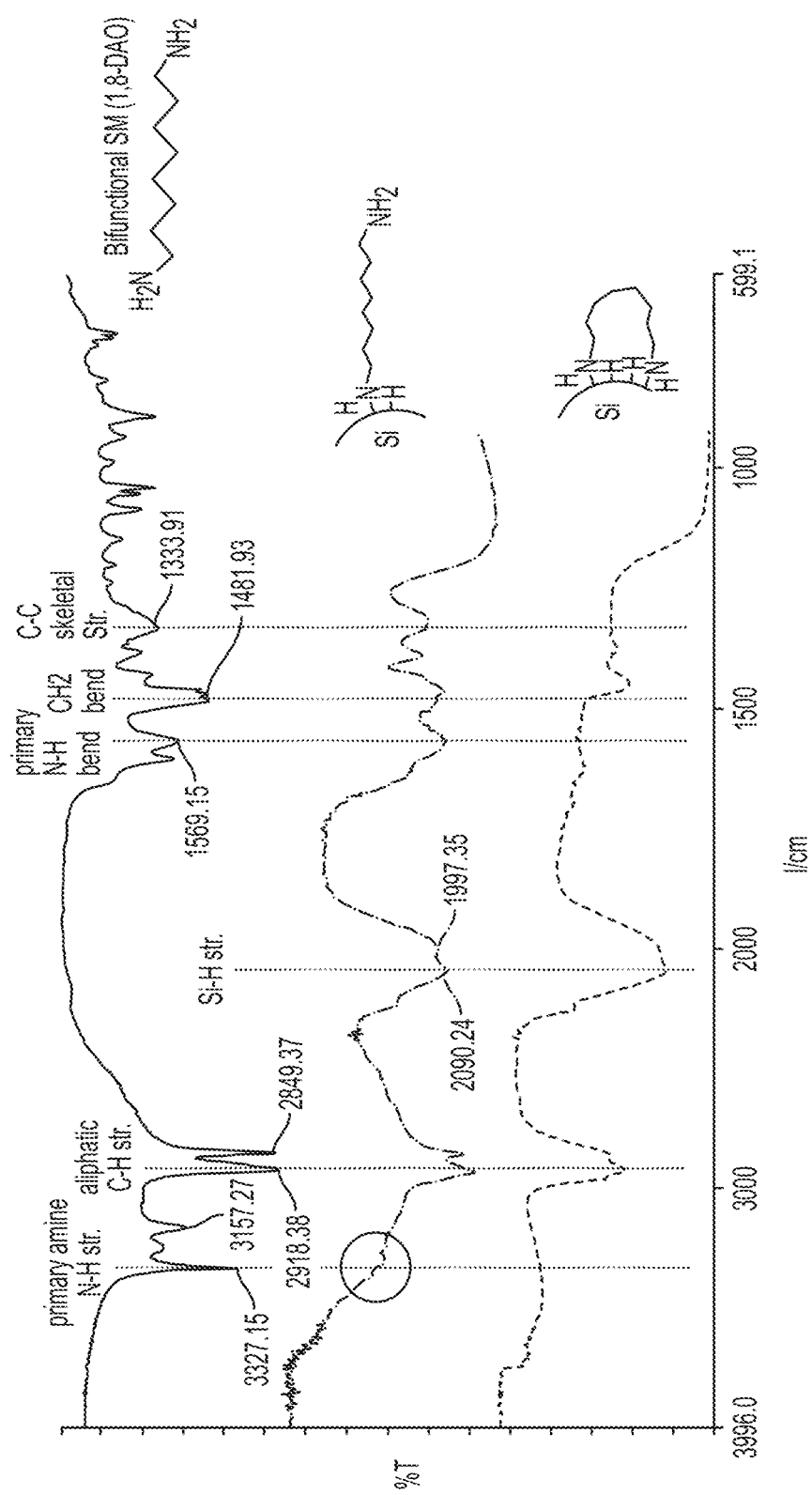
FIG. 6 shows Fourier transform infrared (FTIR) spectra of the bifunctional reagent 1,8-diaminooctane (DAO, top), the same bound by one end of the chain to a Si particle (center), and the same bound by both ends to a Si particle (bottom).
Figure 7:
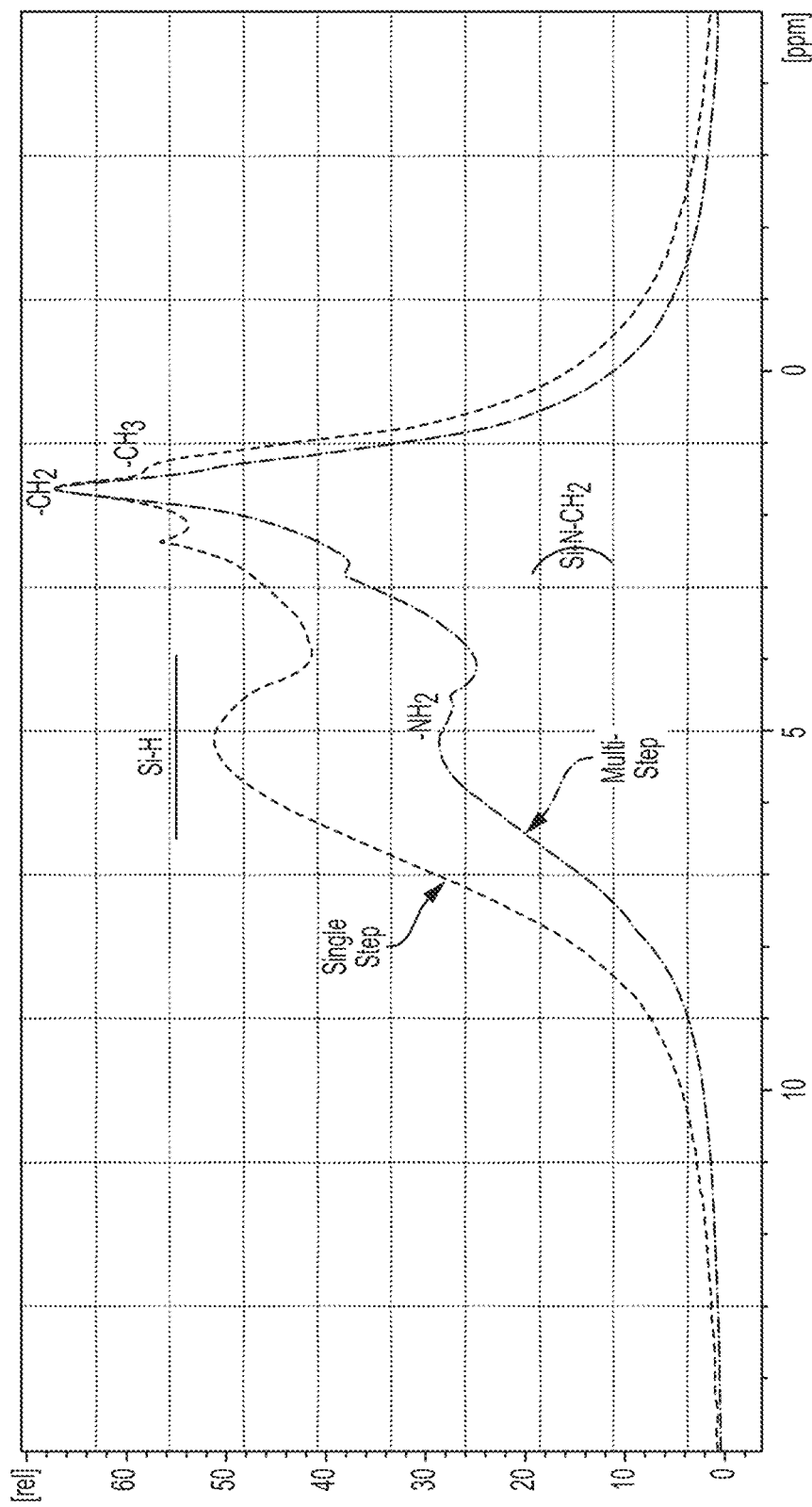
FIG. 7 shows cross-polarization magic angle spinning proton nuclear magnetic resonance ($^1$H CP/MAS NMR) spectra of a 1,8-DAO surface modified Si nanoparticles produced by two methods: 1) "Multi-step" denotes the result of adding DAO at the end of comminution; and 2) in the "single step" process DAO was present from beginning to end of comminution.

This example demonstrates how to chemically bond a bifunctional surface modifier to a silicon particle through just one of the reactive groups, while the other reactive group is still free to react with the surrounding composite materials. In one case, the bifunctional reactive reagent, 1,8-diaminooctane (DAO), was applied as a surface modifier to silicon particles under anaerobic conditions in a single step with comminution, while in another example a multiple step comminution process was conducted with 5% hydrogen, 95% argon used as the anaerobic gas. Except for the timing of when DAO was introduced in the process, all other conditions were equivalent. FTIR (FIG. 6) and $^1$H CP/MAS NMR (FIG. 7) analysis were consistent, showing that there is no free primary amine present in the product derived from the single-step process in which DAO was present from the beginning to the end of comminution. In contrast, when DAO was added toward the end of the comminution process, the product had a chemically bound DAO layer, but it exhibited free amine functional groups, indicating that at least some of the DAO was bound by only one end of the reactive agent, while the other end was available for further reactions.

The formation of a Si—N bond from the primary amine functional group coincides with the formation of a Si—H bond. Possibly because the NMR samples were exposed to air for about 30 minutes before their spectra were acquired, the Si—H resonances appear shifted down field, centered around about 5.2 ppm due to deshielding from surface oxides. The relative population of Si—H bonding of roughly twice as much in the case when DAO was milled with Si from beginning to end of the process is consistent in both FTIR and NMR analyses. Initial passivation by $H_2$ in the multi-step method was not observed to contribute to greater Si—H bonding measured in the products.

Example 5

Figure 8A:
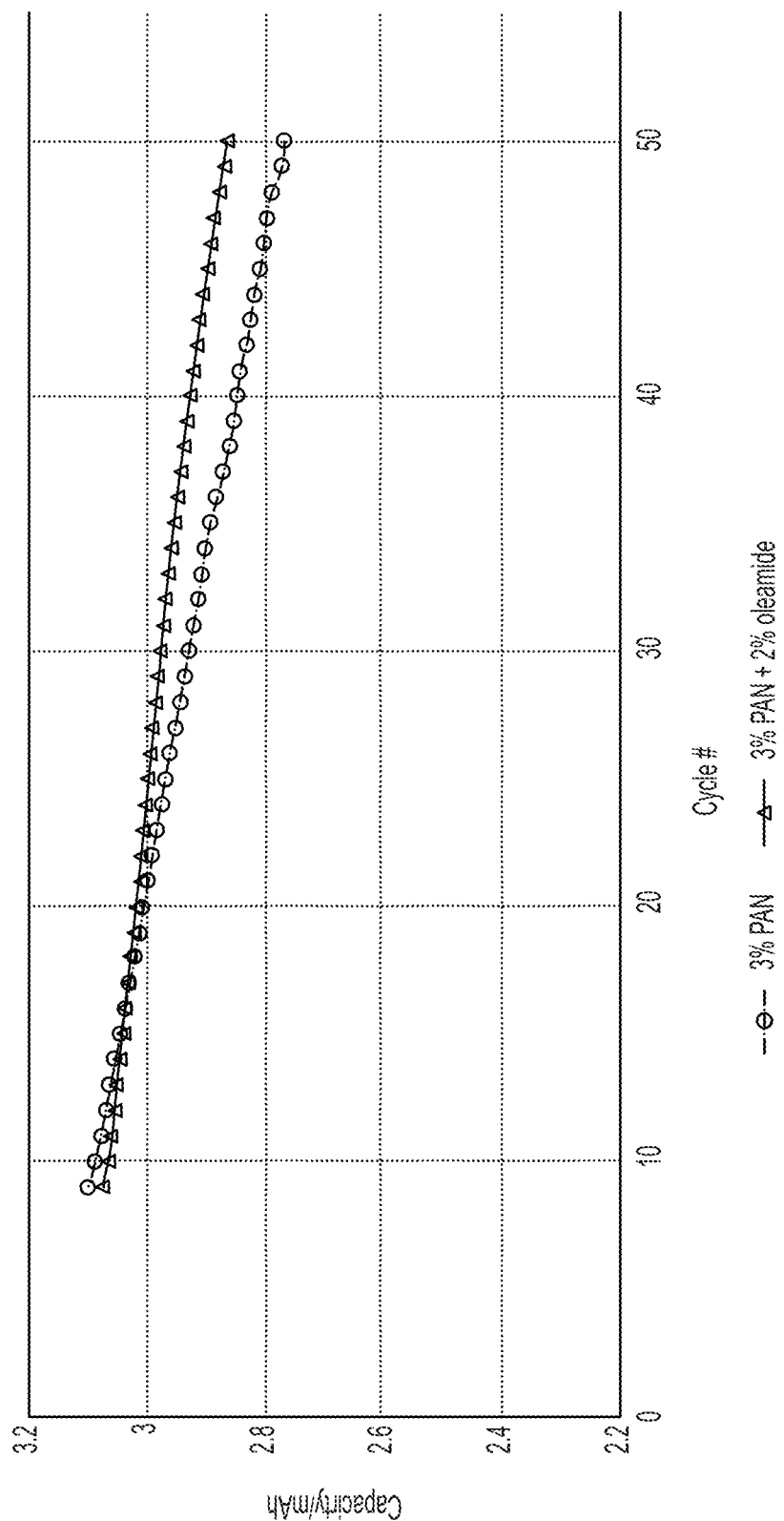
FIG. 8A-8C shows the improvement in cycle efficiency that can be attributed to the addition of oleamide (FIG. 8A). Retained capacity (RC) is from cycles 9 to 50. First cycle capacity (FCE) is shown for the first formation cycle (FIG. 8B: with polyacrylonitrile (PAN) only.
Figure 8B:
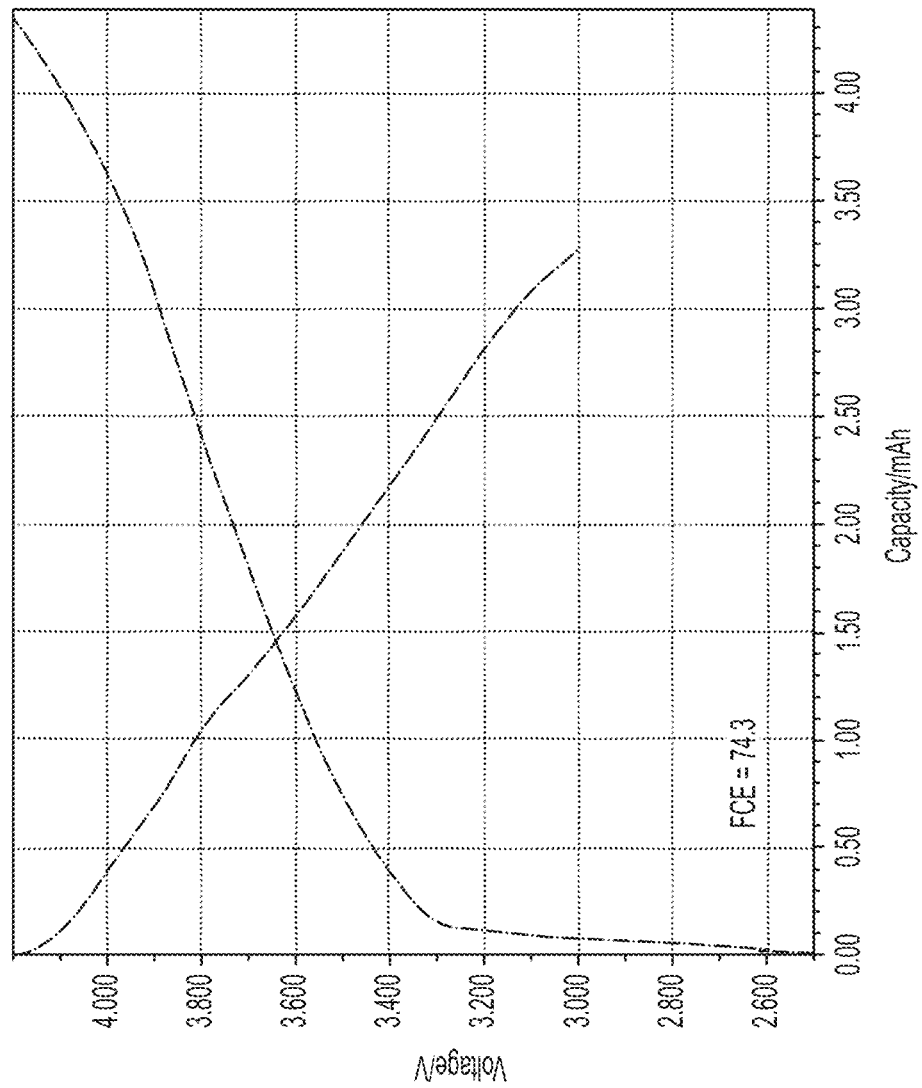
Figure 8C:
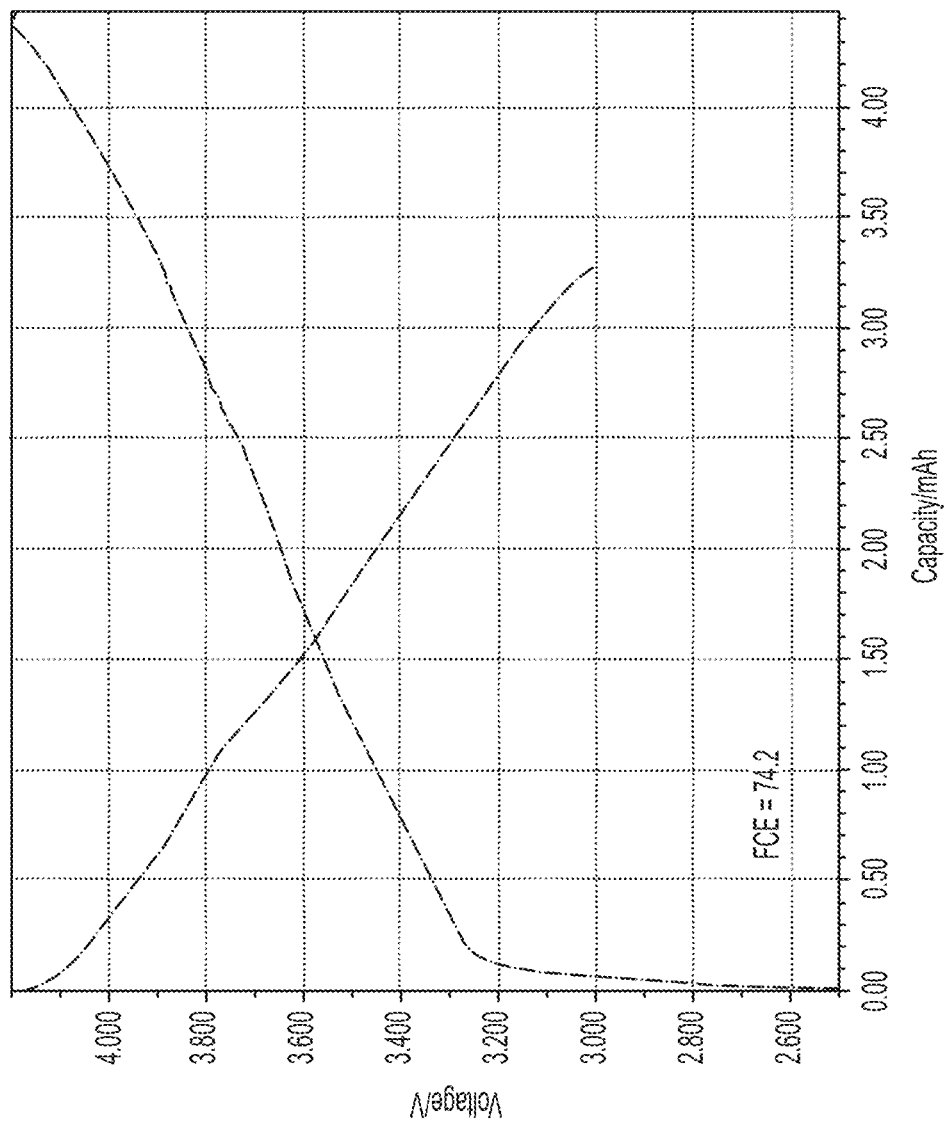

Electrochemical cycle stability can be improved by applying a bifunctional reagent to cross-link after applying a polymer that will be susceptible to reacting with a cross-linking agent. As an example, metallurgical silicon (40 g) was comminuted in the presence of polyacrylamide (PAN; 1.2 g) with the agitator speed set at 12 m/s, with and without adding a diamide cross-linking reagent. In the case where a cross-linking agent was used, the agitator speed was slowed to 8 m/s near the end of the comminution period before adding 0.8 g of oleamide. After circulating for 10 minutes, the slurry was pumped out and the solvent was removed in-vacuo. FIG. 8A, FIG. 8B and FIG. 8C shows the improvement in cycle efficiency that can be attributed to the addition of oleamide.

Figure 9A:
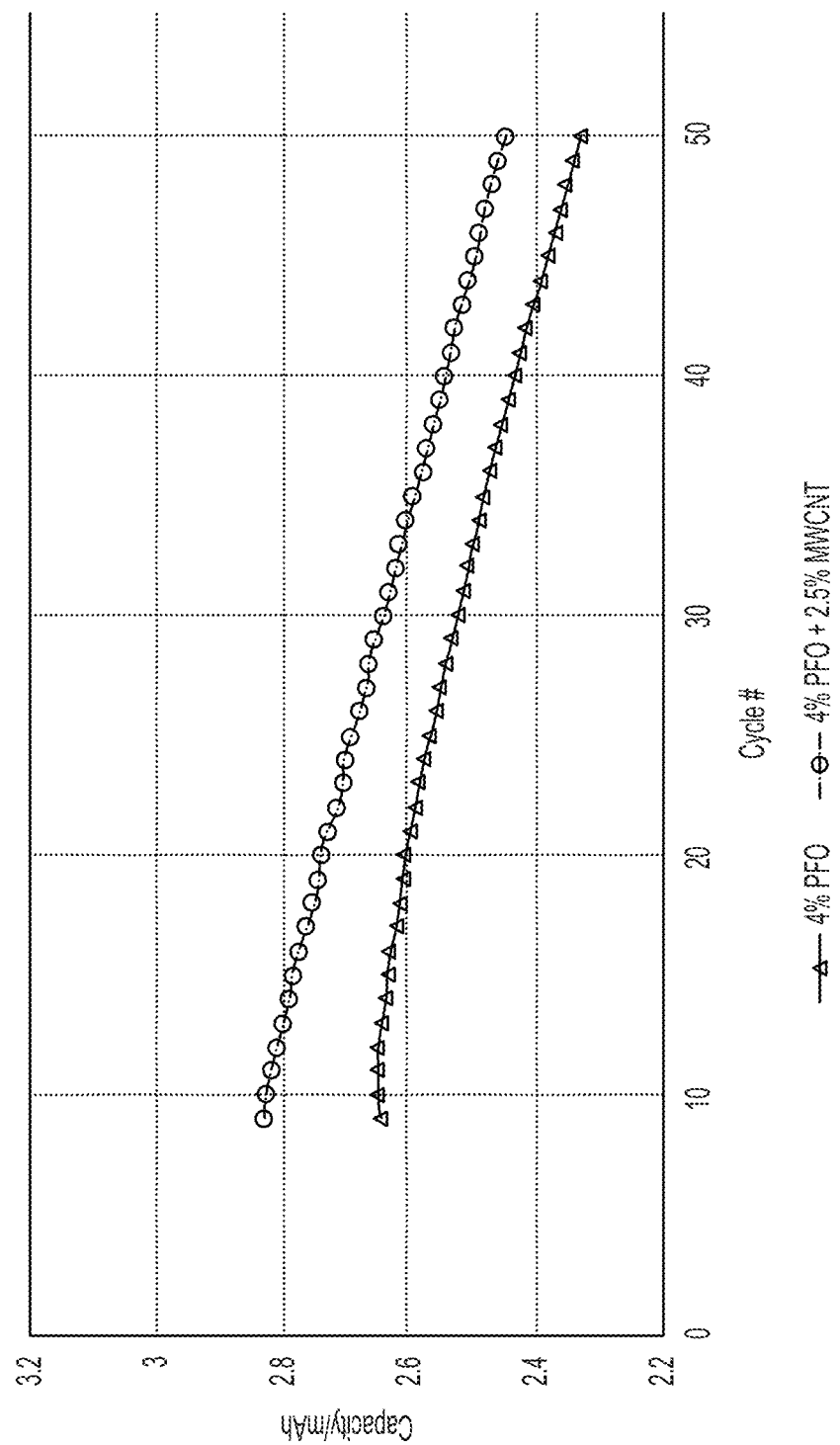
FIG. 9A-9C shows that cycle efficiency drops off slightly for the electrode made from the product without multi-walled carbon nanotubes (MWCNTs) added (FIG. 9A). Retained capacity (RC) is from cycles 9 to 50. First cycle capacity (FCE) is shown for the first formation cycle (FIG. 9B: with 1H,1H,2H-perflurooctene (PFO) only.
Figure 9B:
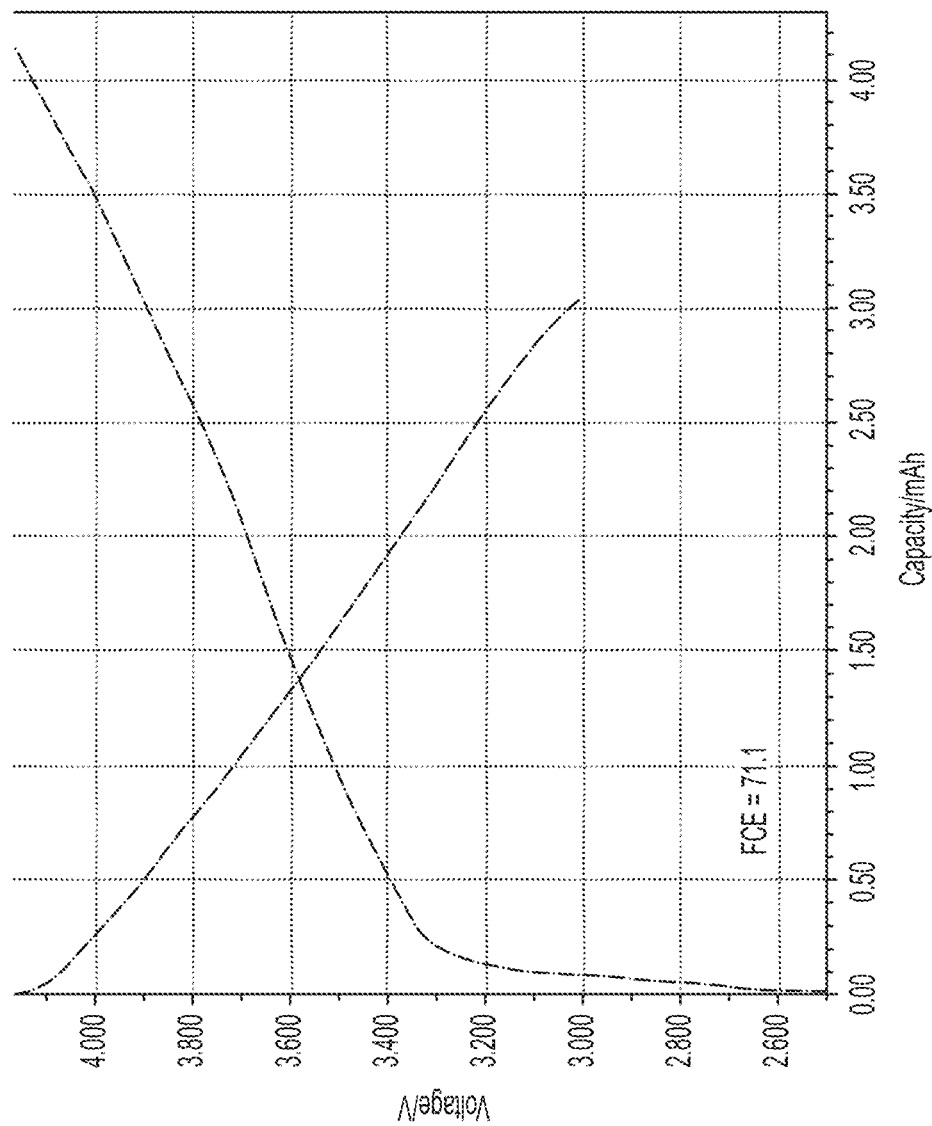
Figure 9C:
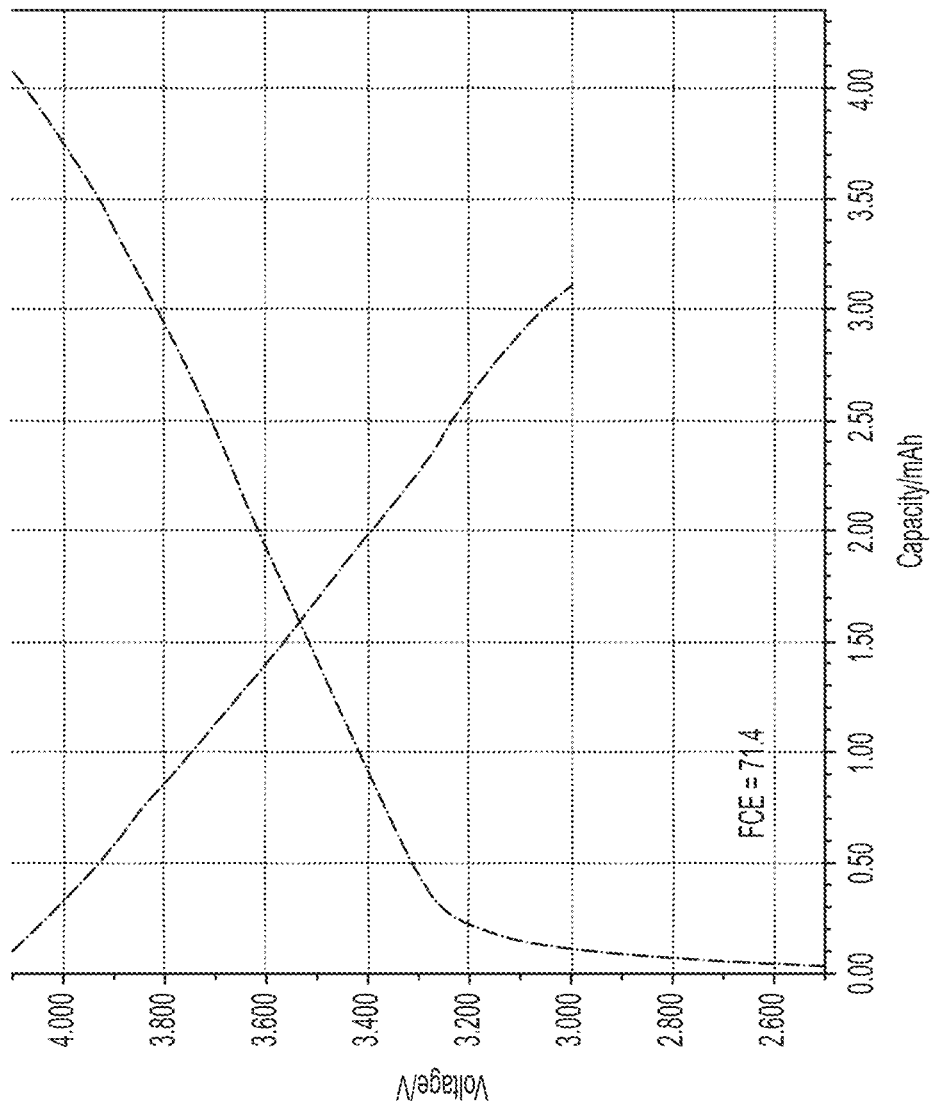

Electrochemical cycle stability can also be improved by the addition of conductive carbon with some polymer coatings. As another example, metallurgical silicon (40 g) was comminuted with and without the presence of multi-walled carbon nanotubes (MWCNTs). In each case, the agitator speed was slowed to 8 m/s near the end of the comminution period before adding 1.2 g of 1H,1H,2H-perflurooctene (PFO) (1.2 g). FIG. 9A, FIG. 9B and FIG. 9C show that cycle efficiency drops off slightly for the electrode made from the product without MWCNTs added. In contrast, the electrode with 2% MWCNTs apparently maintains electrical contacts as evident from its more constant cycle efficiency.

Example 6

Figure 10:
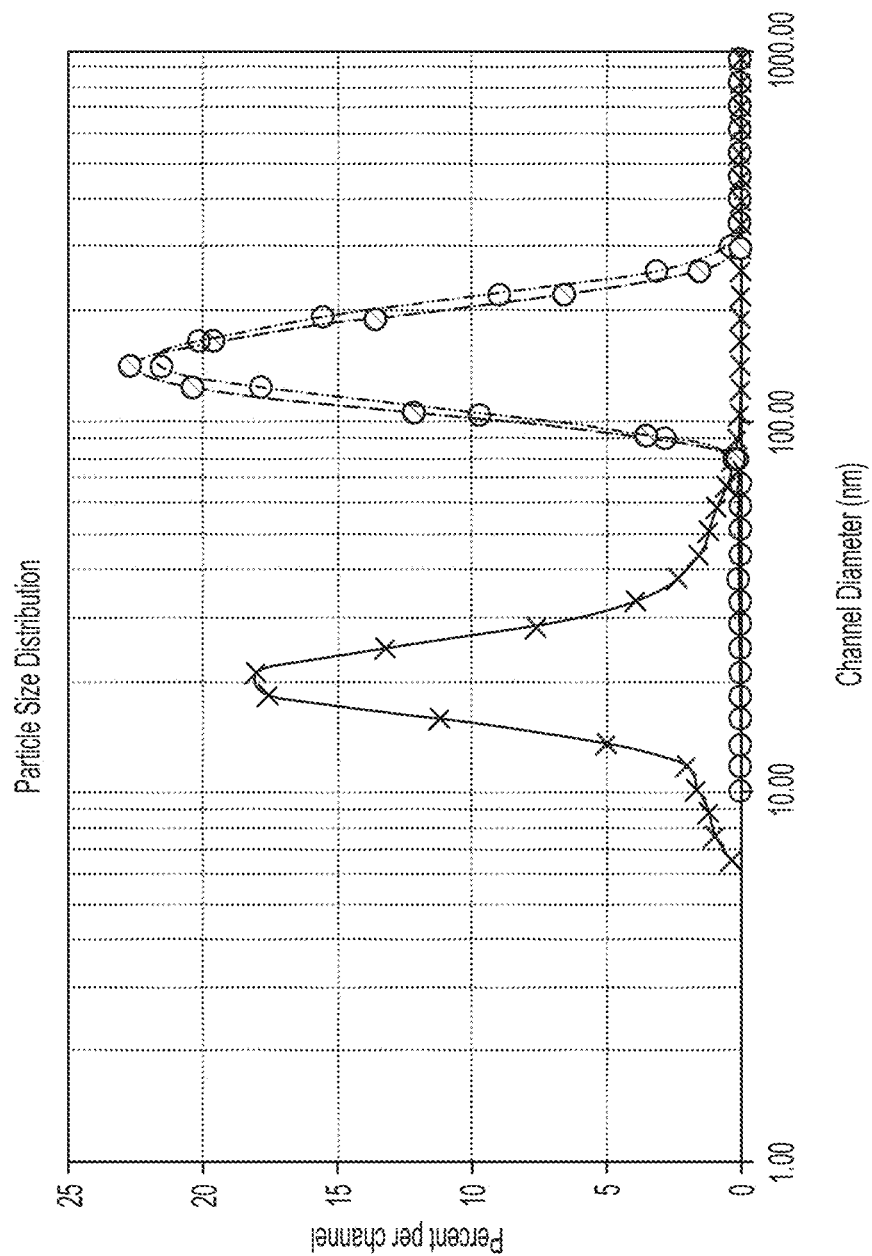
FIG. 10 shows particle size distributions measured by dynamic light scattering (DLS), comparing a one-step addition of 1-decene (x, solid line) with a two-step process (open circle, solid line) and a two-step process without 1-decene (open circle, dotted line). The samples were comminuted for 300 min, 300 min, and 270 min, respectively.

This example demonstrates that when milling Si in the presence of a terminal alkene, the particle size range of the product cannot be easily controlled without using a stepwise process, or by the addition of a filtration step. For example, the particle size distribution of Si particles milled in a single step with 1-decene is too small and has far too much surface area for typical battery applications. FIG. 10 exhibits the particle size distribution as measured by dynamic light scattering (DLS) of the products from silicon milled in an agitator bead mill in a normal saturated alkane solvent free from oxygen with 4 wt % of 1-decene added. In one case (A, x), the 1-decene was present from the beginning to the end of milling. In the other case (B, open circle), the same quantity of 1-decene was added only 5 minutes prior to ending the run. In the latter case, the agitator was slowed to a low rotation rate such that further comminution ceased while the 1-decene was allowed to stir into the Si NP slurry.

It is clear from these experiments that, while both batches of Si nanoparticles have an alkane surface coating, the particle size distribution of the products are very different, demonstrating that the average PSD is highly dependent on the time of exposure to the surface modifier while comminution occurs. The silicon particles milled by the one-step method for 300 minutes have a PSD with $D_{50}$ of 21 nm, while the $D_{50}$ for a bead milled process in which 1-decene was added at the end of the run is 142 nm.

Additionally, the one-step method produced particles that retained their crystallinity, while the two-step bead milling process was capable of producing particles dominated by amorphous phase silicon. The conversion of crystalline or polycrystalline particles to amorphous silicon particles can occur when no reactive media is present during comminution and fractured particles recombine with each other instead of with another passivating agent. This process of fracturing and recombining produces extremely small crystalline domains and eventually causes the Si particles to become amorphous. Adding 1-decene at the end of the comminution process coated and passivated the larger amorphous particles with a layer of the reactive agent, but the particles will remain large if comminution is discontinued after the reactive agent is added.

The extent of crystallinity of the particles can be measured by fitting powder X-ray diffraction data to simulation (e.g., a best fit from simulation might show the sample is 65% amorphous, 35% crystalline), or domains of crystalline and amorphous phases may be observed by high resolution transmission electron microscopy (HRTEM), for example.

5. Exemplary Embodiments

For reasons of completeness, various aspects of the invention are set out in the following numbered clauses:

Clause 1. A method of producing a negative electrode, comprising: a) comminuting Li-Group IVA alloy particles in a solvent to a desired particle size distribution range; b) exposing surfaces of the Li-Group IVA alloy particles to at least one surface modifier present during the comminution process; c) the at least one surface modifier forming at least one continuous coating on at least one of the exposed surfaces of the Li-Group IVA alloy particles; d) removing the solvent; and e) adding the surface-modified Li-Group IVA alloy particles to a negative electrode material by a coating process.

Clause 2. The method of clause 1, wherein the comminuting is performed by a circulating bead mill.

Clause 3. The method of any one of clauses 1-2, wherein a forming gas comprising $H_2$ is present during the comminution.

Clause 4. The method of any one of clauses 1-3, wherein the Li-Group IVA alloy particles in step a) comprise LiSi, LiGe, LiSn, or Li and a combination of Si, Ge, or Sn together or in any combination.

Clause 5. The method of any one of clauses 1-4, wherein the solvent is selected from the group consisting of cycloalkanes, hexanes, heptanes, octanes, cyclohexanes, and any other saturated alkane.

Clause 6. The method of any one of clauses 1-5, wherein the Li-Group IVA alloy particle size distribution is reduced to a range of about 1,000 to about 44,000 nm.

Clause 7. The method of any one of clauses 1-6, wherein the Li-Group IVA alloy particle size distribution is reduced to a range of about 10 to about 1,000 nm.

Clause 8. The method of any one of clauses 1-7, wherein the Li-Group IVA alloy particle size distribution is reduced to a range of about 400 to about 600 nm.

Clause 9. The method of any one of clauses 1-8, wherein the at least one surface modifier comprises a polymer or a monomer additive.

Clause 10. The method of any one of clauses 1-9, wherein the at least one surface modifier comprises a polymer additive selected from the group consisting of polystyrene, polyacrylonitrile, polyacrylic acid, lithium polyacrylate, and polyaniline.

Clause 11. The method of any one of clauses 9-10, wherein the polymer additive covalently bonds to the surfaces of the Li-Group IVA particles.

Clause 12. The method of any one of clauses 9-11, wherein the continuous coatings comprising the polymer surface modifier are thermally processed or crosslinked with a reagent.

Clause 13. The method of any one of clauses 1-12, wherein the at least one surface modifier comprises a monomer additive selected from the group consisting of alkenes, alkynes, aromatics, heteroaromatics, cycloalkenes, alcohols, glycols, polyglycols, ethers, polyethers, thiols, disulfides, amines, amides, pyridines, pyrroles, imides, imidazoles, imidazoline, furans, thiophenes, nitriles, cyanates, isocyanates, isothiocyanates, ketones, carboxylic acids, esters, amino acids, aldehydes, acrylates, methacrylates, oxylates, organic carbonates, lactones and gases, $H_2$, $O_2$, $CO_2$, $N_2O$, HF, and fluorinated analogs thereof when applicable.

Clause 14. The method of any one of clauses 1-13, wherein the at least one surface modifier comprises a metal-oxide or a metal-alkoxide.

Clause 15. The method of any one of clauses 1-14, wherein the at least one surface modifier comprises a metal-oxide selected from the group consisting of $Al_2O_3$, $TiO_2$, $Li_4Ti_5O_{12}$, MgO, NiO, and borates.

Clause 16. The method of any one of clauses 1-15, wherein the at least one surface modifier comprises a metal alkoxide selected from the group consisting of magnesium alkoxides, aluminum alkoxides, titanium alkoxides, zinc alkoxides, and lithium alkoxides.

Clause 17. The method of any one of clauses 1-16, wherein the at least one surface modifier comprises an inorganic carbon surface modifier.

Clause 18. The method of any one of clauses 1-17, wherein the at least one surface modifier comprises an inorganic carbon surface modifier selected from the group consisting of single-walled carbon nanotubes, multi-walled carbon nanotubes, nanospherical carbon, fullerenes, graphene, graphite, and carbon black.

Clause 19. The method of any one of clauses 1-18, wherein the at least one surface modifier comprises a Li salt.

Clause 20. The method of any one of clauses 1-19, wherein the at least one surface modifier comprises a Li salt selected from the group consisting of LiF, $Li_2O_2$, $Li_2CO_3$, $LiBF_2(C_2O_4)$, and $Li_2(C_2O_4)$.

Clause 21. The method of any one of clauses 1-20, wherein the continuous coatings form protective shells which impede diffusion of oxygen and/or water to the Li-Group IVA alloy particles, wherein the continuous coatings allow Li+ ion mobility and/or facilitate electrical charge transfer from the Li-Group IVA alloy particle to an electrode current collector.

Clause 22. The method of any one of clauses 1-21, wherein the continuous coatings cover the surfaces of the Li-Group IVA particles with layers greater than or equal to about 2 nm and less than or equal to about 500 nm thick.

Clause 23. The method of any one of clauses 1-22, wherein the solvent removal is done by an evaporation process which is performed by spray drying and/or evaporation under reduced pressure in a suitable atmosphere.

Clause 24. The method of any one of clauses 1-23, wherein the Li-Group IVA alloy particles with continuous coatings are heated.

Clause 25. The method of any one of clauses 1-24, wherein the Li-Group IVA alloy particles with continuous coatings are heated at about 200° C. to about 1200° C. for about 30 minutes to about 10 hours under a suitable atmosphere.

Clause 26. The method of clause 23 or clause 25, wherein the suitable atmosphere comprises air, Ar, $Ar/H_2$, and/or vacuum.

Clause 27. The method of any one of clauses 1-26, wherein the coating process is performed by addition of carbon black, graphite, or any other additive used with aqueous binder systems in conventional Li ion battery negative electrode slurries.

Clause 28. The method of any one of clauses 1-27, wherein the coating process is performed by addition of any additive used with non-aqueous binder systems in conventional Li ion battery production.

Clause 29. The method of any one of clauses 1-28, wherein a Li-organic complex or a Na-organic complex delivers Li to a Group IVA particle during comminution to form at least one of the Li-Group IVA alloy particles.

Clause 30. The method of any one of clauses 1-29, wherein the Li-organic or the Na-organic complex is a polycyclic aromatic compound.

Clause 31. The method of clause 30, wherein the polycyclic aromatic compound is selected from the group consisting of pyrene, perylene, and naphthalene.

Clause 32. The method of any one of clauses 30-31, wherein when a current is applied with Li foil as a counter electrode and with a Si/graphite electrode laminated on a Cu current collector as a working electrode the polycyclic aromatic compound functions as an electrolyte and the laminate becomes partially charged with Li.

Clause 33. The method of any one of clauses 1-32, wherein at least one of the Li-Group IVA alloy particles are formed during comminution in step a) from Li-active solar grade Si wafer kerf, Li-active solar grade Ge wafer kerf, and/or Li-active metallurgical silicon.

Clause 34. The method of any one of clauses 1-33, further comprising: f) incorporating the negative electrode material into a slurry production process for producing a negative electrode for a battery.

Clause 35. The method of clause 12, wherein the reagent is a monomer additive selected from the group consisting of alkenes, alkynes, aromatics, heteroaromatics, cycloalkenes, alcohols, glycols, polyglycols, ethers, polyethers, thiols, disulfides, amines, amides, pyridines, pyrroles, imides, imidazoles, imidazoline, furans, thiophenes, nitriles, cyanates, isocyanates, isothiocyanates, ketones, carboxylic acids, esters, amino acids, aldehydes, acrylates, methacrylates, oxylates, organic carbonates, lactones and gases, $H_2$, $O_2$, $CO_2$, $N_2O$, HF, and fluorinated analogs thereof when applicable.

Clause 36. The method of clause 2, wherein the milling bead is a hard ceramic material.

Clause 37. The method any one of clause 2 or clause 36, wherein the milling bead has a diameter from about 100 to about 1,000 microns.

Clause 38. The method of any one of clauses 2 or 36-37, wherein the milling bead has a diameter from about 300 to about 700 microns.

Clause 39. The method of any one of clauses 1-38, wherein comminution includes using an agitator speed between about 2 to about 45 m/s for about 15 to about 1200 minutes.

Clause 40. A prelithiated negative electrode made by any of the methods of clauses 1-39.

Clause 41. A Li-Group IVA alloy particle having a surface area coated by at least one surface modifier, the at least one surface modifier comprising a polymer additive or a monomer additive.

Clause 42. The particle of clause 41 wherein the wherein the Li-Group IVA alloy particles comprise LiSi, LiGe, LiSn, or Li and a combination of Si, Ge, or Sn together or in any combination.

Clause 43. The particle of clauses 41-42 wherein the monomer additive is selected from the group consisting of alkenes, alkynes, aromatics, heteroaromatics, cycloalkenes, alcohols, glycols, polyglycols, ethers, polyethers, thiols, disulfides, amines, amides, pyridines, pyrroles, imides, imidazoles, imidazoline, furans, thiophenes, nitriles, cyanates, isocyanates, isothiocyanates, ketones, carboxylic acids, esters, amino acids, aldehydes, acrylates, methacrylates, oxylates, organic carbonates, lactones and gases, $H_2$, $O_2$, $CO_2$, $N_2O$, HF, and fluorinated analogs thereof when applicable.

Clause 44. The method of any of clauses 1-38, wherein a forming gas comprising $H_2$ and an inert noble gas is present during step a).

Clause 45. The method of any of clauses 1-38 and 44, wherein the Li-Group IVA alloy particles in step a) comprise an alloy of Li and Si and/or an alloy of Li, Si, and Sn.

Clause 46. The method of any of clauses 1-38, 44, and 45, wherein the Li-Group IVA alloy particle size distribution is reduced to a range of about 400 to about 600 nm, as measured by Dynamic Light Scattering (DLS).

Clause 47. The method of any of clauses 1-38 and 44-46, wherein the at least one surface modifier comprises a polymer additive selected from the group consisting of polystyrene, polyacrylonitrile, polyacrylic acid, lithium polyacrylate, and polyaniline, wherein the polymer additive covalently bonds to the surfaces of the Li-Group IVA particles.

Clause 48. The method of any of clauses 1-38 and 44-47, wherein the at least one continuous coating comprises a thermally processed and/or cross-linked polymer.

Clause 49. The method of any of clauses 1-38 and 44-48, wherein the at least one surface modifier further comprises a metal-oxide selected from the group consisting of $Al_2O_3$, $TiO_2$, $Li_4Ti_5O_{12}$, MgO, NiO, and borates.

Clause 50. The method of any of clauses 1-38 and 44-49, wherein the at least one surface modifier further comprises a metal alkoxide selected from the group consisting of magnesium alkoxides, aluminum alkoxides, titanium alkoxides, zinc alkoxides, and lithium alkoxides.

Clause 51. The method of any of clauses 1-38 and 44-50, wherein the at least one surface modifier further comprises an inorganic carbon surface modifier selected from the group consisting of single walled carbon nanotubes, multi walled carbon nanotubes, nanospherical carbon, fullerenes, graphene, graphite, and carbon black.

Clause 52. The method of any of clauses 1-38 and 44-51, wherein the at least one surface modifier further comprises a Li salt selected from the group consisting of LiF, $Li_2O_2$, $Li_2CO_3$, $LiBF_2(C_2O_4)$, and $Li_2(C_2O_4)$.

Clause 53. The method of any of clauses 1-38 and 44-52, wherein a polycyclic aromatic compound selected from the group consisting of pyrene, perylene, and naphthalene delivers Li to a Group IVA particle during comminution to form at least one of the Li-Group IVA alloy particles.

Clause 54. The method of clause 53, wherein a current is applied with Li foil as a counter electrode and with a Si/graphite electrode laminated on a Cu current collector as a working electrode to form a laminate, wherein the polycyclic aromatic compound functions as an electrolyte and the laminate becomes partially charged with Li.

Clause 55. The method of any of clauses 1-38 and 44-54, wherein at least one of the Li-Group IVA alloy particles are formed during comminution in step a) from Li-active solar grade Si wafer kerf, Li-active solar grade Ge wafer kerf, and/or Li-active metallurgical silicon.

Clause 56. The method of any of clauses 1-38 and 44-55, further comprising: f) incorporating the negative electrode material into a slurry production process for producing a negative electrode for a battery.

Clause 57. The method of any of clauses 1-38 and 44-56, wherein comminution includes using an agitator speed between about 6 to about 14 m/s for about 1 to about 100 min residence time.

Clause 58. The method of any of clauses 1-38 and 44-57 further comprising exposing the Li-Group IVA particles to a second at least one surface modifier, wherein the second at least one surface modifier replaces or covalently bonds to the at least one surface modifier wherein the second at least one surface modifier is added after the start of comminution and before the end of comminution.

Clause 59. The method of any of clauses 1-38 and 44-58, wherein the percent crystallinity of the Li-Group IVA alloy particles are controlled to a desired amount, as determined by powder X-ray diffraction (PXRD).

Clause 60. The method of any of clauses 1-38 and 44-59, wherein the at least one surface modifier resides in grains between Li-Group IVA alloy particles in a micron-sized cluster of the Li-Group IVA alloy particles.

What is claimed is:

1. A method of producing a negative electrode, the method comprising:
    comminuting Li-Group IVA alloy particles in a solvent to a submicron particle size range;
    exposing surfaces of the Li-Group IVA alloy particles to at least one monomer or polymer surface modifier present during the comminution process;
    the at least one surface modifier forming at least one continuous coating on at least one of the exposed surfaces of the Li-Group IVA alloy particles;
    before an end of comminuting and after exposing surfaces of the Li-Group IVA alloy particles to the at least one monomer or polymer surface modifier, adding a second at least one surface modifier to the solvent, wherein the second at least one surface modifier replaces or covalently bonds to the at least one surface modifier;
removing the solvent;
after removing the solvent, heating the surface-modified Li-Group IVA alloy particles at 200° C. to 1200° C. for 30 minutes to 24 hours; and
adding the surface-modified Li-Group IVA alloy particles to a negative electrode material by a coating process,
thereby yielding a particle size distribution of less than 600 nm full width at half maximum (FWHM) and a greater than 95% yield.

2. The method of claim 1, wherein a forming gas comprising $H_2$ and an inert noble gas is present during comminuting.

3. The method of claim 1, wherein the Li-Group IVA alloy particles during comminuting comprise an alloy of Li and Si and/or an alloy of Li, Si, and Sn.

4. The method of claim 1, wherein the Li-Group IVA alloy particle size distribution is reduced to a range of about 400 to less than 600 nm, as measured by Dynamic Light Scattering (DLS).

5. The method of claim 1, wherein the at least one surface modifier comprises a polymer additive selected from the group consisting of polystyrene, polyacrylonitrile, polyacrylic acid, lithium polyacrylate, and polyaniline, wherein the polymer additive covalently bonds to the surfaces of the Li-Group IVA particles.

6. The method of claim 1, wherein the at least one continuous coating comprises a thermally processed and/or cross-linked polymer.

7. The method of claim 1, wherein the at least one surface modifier further comprises a metal-oxide selected from the group consisting of $Al_2O_3$, $TiO_2$, $Li_4Ti_5O_{12}$, MgO, NiO, and borates.

8. The method of claim 1, wherein the at least one surface modifier further comprises a metal alkoxide selected from the group consisting of magnesium alkoxides, aluminum alkoxides, titanium alkoxides, zinc alkoxides, and lithium alkoxides.

9. The method of claim 1, wherein the at least one surface modifier further comprises an inorganic carbon surface modifier selected from the group consisting of single walled carbon nanotubes, multi walled carbon nanotubes, nanospherical carbon, fullerenes, graphene, graphite, and carbon black.

10. The method of claim 1, wherein the at least one surface modifier further comprises a Li salt selected from the group consisting of LiF, $Li_2O_2$, $Li_2CO_3$, $LiBF_2(C_2O_4)$, and $Li_2(C_2O_4)$.

11. The method of claim 10, wherein a current is applied with Li foil as a counter electrode and with a Si/graphite electrode laminated on a Cu current collector as a working electrode to form a laminate, wherein the polycyclic aromatic compound functions as an electrolyte and the laminate becomes partially charged with Li.

12. The method of claim 1, wherein a polycyclic aromatic compound selected from the group consisting of pyrene, perylene, and naphthalene delivers Li to a Group IVA particle during comminution to form at least one of the Li-Group IVA alloy particles.

13. The method of claim 1, wherein at least one of the Li-Group IVA alloy particles are formed during comminution from Li-active solar grade Si wafer kerf, Li-active solar grade Ge wafer kerf, and/or Li-active metallurgical silicon.

14. The method of claim 1, further comprising:
incorporating the negative electrode material into a slurry production process for producing a negative electrode for a battery.

15. The method of claim 1, wherein comminution includes using an agitator speed between about 6 to about 14 m/s for about 1 to about 100 min residence time.

16. The method of claim 1, wherein the percent crystallinity of the Li-Group IVA alloy particles are controlled to be less than about 40%, as determined by powder X-ray diffraction (PXRD).

17. The method of claim 1, wherein the at least one surface modifier resides in grains between Li-Group IVA alloy particles in a micron-sized cluster of the Li-Group IVA alloy particles.

* * * * *